US012726464B1

(12) United States Patent
Reddy et al.

(10) Patent No.: US 12,726,464 B1
(45) Date of Patent: Sep. 1, 2026

(54) ZERO-TRUST LAYER SEVEN ENCRYPTION

(71) Applicant: Citibank, N.A., New York, NY (US)

(72) Inventors: Umesh Reddy, Irving, TX (US); Akash Gujarathi, Irving, TX (US); Ranjith Duligunti, Irving, TX (US); Michael A. King, Ellisville, MO (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/360,549

(22) Filed: Oct. 16, 2025

(51) Int. Cl.
*H04L 29/06* (2006.01)
*H04L 9/08* (2006.01)
*H04L 9/40* (2022.01)

(52) U.S. Cl.
CPC ........ *H04L 63/0428* (2013.01); *H04L 9/0861* (2013.01)

(58) Field of Classification Search
CPC .......................... H04L 63/0428; H04L 9/0861
USPC .......................................................... 713/160
See application file for complete search history.

(56) References Cited

U.S. PATENT DOCUMENTS

2004/0203591 A1* 10/2004 Lee ....................... H04L 9/0662 455/410
2007/0116285 A1* 5/2007 Nakai ................. H04L 63/0428 380/255
2009/0169000 A1* 7/2009 Shintani ........... H04N 21/23897 713/189
2018/0025332 A1* 1/2018 Huang ................... G06Q 20/10 705/71
2018/0139297 A1* 5/2018 Demsey ................ H04L 63/123
2020/0053103 A1* 2/2020 Rehak ................. H04L 63/1425
2020/0067887 A1* 2/2020 Sarwar ....................... H04L 9/16
2022/0109559 A1* 4/2022 Kalach ..................... H04L 9/085
2022/0337566 A1* 10/2022 Hill ..................... H04L 63/0435
2023/0164122 A1* 5/2023 Collinge ................. H04L 9/088 713/171

OTHER PUBLICATIONS

Asmara, "Cipher Feedback Mode Cryptographic Algorithm With Gingerbreadman Two-dimensional Map Key Generator on Digital Image", 2017, ICTS, pp. 169-173 (Year: 2017).*
Thakur, "A Comprehensive Review of Wireless Security Protocols and Encryption Applications", 2023, IEEE, pp. 373-379 (Year: 2023).*

* cited by examiner

*Primary Examiner* — Taghi T Arani
*Assistant Examiner* — Gregory A Lane
(74) *Attorney, Agent, or Firm* — Perkins Coie LLP

(57) ABSTRACT

The present disclosure provides a system for securing communications between services in different computing environments. A pair-wise secret key may be generated at an inspection layer for a first service in a first environment and a second service in a second environment. Each service may be associated with an inspection layer component, and the pair-wise secret key is provided to both components. When a communication with encrypted payload is received from the first service, an initial decryption vector may be determined using the communication, creating a unique vector for each communication. A unique decryption key may be generated combining the decryption vector and pair-wise secret key. The encrypted payload may then be decrypted using this unique key, and the decrypted communication may be transmitted to the second service for processing.

18 Claims, 13 Drawing Sheets

300

```
subroutine_encrypt_service_token(){
        (private_key, public_key) = generate_keypair();
        transmit_public_key(public_key);
        message = await channel.recv();
        if (message != null){
                //server (public key, private key) = keypair generated at server using public_key as seed
                (server_public_key) = message;
                //Create a AES key based on client_pvt_key & server_pub_key
                AES_key = generate_key(private_key, server_public_key)
                //fetch the service_account token
                service_account_token = fetch();
                //encrypt with AES key
                encrypted_service_account_token = encrypt(service_account_token, server_public_key;
        }
        return encrypted_service_account_token;
}
```

```
subroutine_generate_second_service_key(){
        ///Fetch AES key based on client_pub_key (e.g., public key from service platform)
        try:
                AES_key = fetch();

        //Create AES key based on client_pub_key (e.g., public key from service platform)
        //should be the same as AES independently generated on service platform
        except:
                AES_key = generate_key(server_private_key, client_pub_key);
                //cache AES key based on client pub key
                cache(AES_key, client_pub_key);

        //4.4.2 If AES key not available, create EC keypair with client_pub seed
        except:
                (server_private_key, server_public_key) = generate_keypair(client_pub_key);
                transmit_public_key(server_public_key);
                //Generate AES based of client pub key & server pvt key
                AES_key = generate_key(server_private_key, client_pub_key);
                //cache AES key based on client pub key
                cache(AES_key, client_pub_key);
                //next run decrypt to decrypt token with AES key corresponding to client_pub_key
}
```

```
service_identity_token{
        service_identity{
                cluster_identifier: “cluster_3”
                name_space: “my-name-space”
                deployment_name: “e-commerce service”
                }
        private_access_key: “1k2wnduxhaisHIUDH”
        key_identifier: “key_34”
}
```

```
usage_token{
        service_identity_token{
                service_identity{
                cluster_identifier: “cluster_3”
                name_space: “my-name-space”
                deployment_name: “e-commerce service”
                }
        private_access_key: “1k2wnduxhaisHIUDH”
        key_identifier: “key_34”
        }
        server_token{
                typ: “JWT”
                name: “entity_2”
                permissions: [‘read’, ‘write’, ‘delete’]
                }
}
```

FIG. 4B

Attorney Docket No.: 124072.8282.US00

800

| Pair ID (802) | Service_A ID (804) | Service_B ID (806) | Pair-Wise Secret Key (808) |
|---|---|---|---|
| P101 | Env_1-Svc_1 | Env_2-Svc_1 | ACX15A5B3A |
| P102 | Env_1-Svc_2 | Env_2-Svc_1 | BCX515B3B |
| P103 | Env_1-Svc_1 | Env_2-Svc_2 | ZCX45A4B9A0 |

| Communication ID (902) | Comm Payload (904) | Initial Decryption Vector (906) | Other Data (908) |
|---|---|---|---|
| C101 | ADPQOPEJFPOIA | B123456 | ACX15A5B3A |
| C102 | ZCIVZPCIPZICV[Z | B1456ASD | BCX515B3B |
| C103 | ZMNMNVAOIPW | Z123456 | ZCX45A4B9A0 |

| Communication ID (1002) | Tracking ID (1004) | Span ID (1006) | Other Data (1008) |
|---|---|---|---|
| C101 | ADPQOPEJFPOIA | B123456 | ACX15A5B3A |
| C102 | ZCIVZPCIPZICV[Z | B1456ASD | BCX515B3B |
| C103 | ZMNMNVAOIPW | Z123456 | ZCX45A4B9A0 |

| Communication ID | Comm Payload | Parameter 1 | Parameter 2 |
| --- | --- | --- | --- |
| C101 | ADPQOPEJFPOIA | B123456 | ACX15A5B3A |
| C102 | ZCIVZPCIPZICV[Z | B1456ASD | BCX515B3B |
| C103 | ZMNMNVAOIPW | Z123456 | ZCX45A4B9A0 |

Generate a pair-wise secret key for a pair of services comprising a first service and a second service

1204

Provide the pair-wise secret key to the first inspection layer component and to the second inspection layer component

1206

Receive a communication comprising an encrypted communication payload

1208

Determine an initial decryption vector for generating a unique decryption key

1210

Generate the unique decryption key using a combination of the initial decryption vector and the pair-wise secret key

1212

Decrypt the encrypted communication payload using the unique decryption key to generate a decrypted communication

1214

Transmit the decrypted communication from the inspection layer to the second service

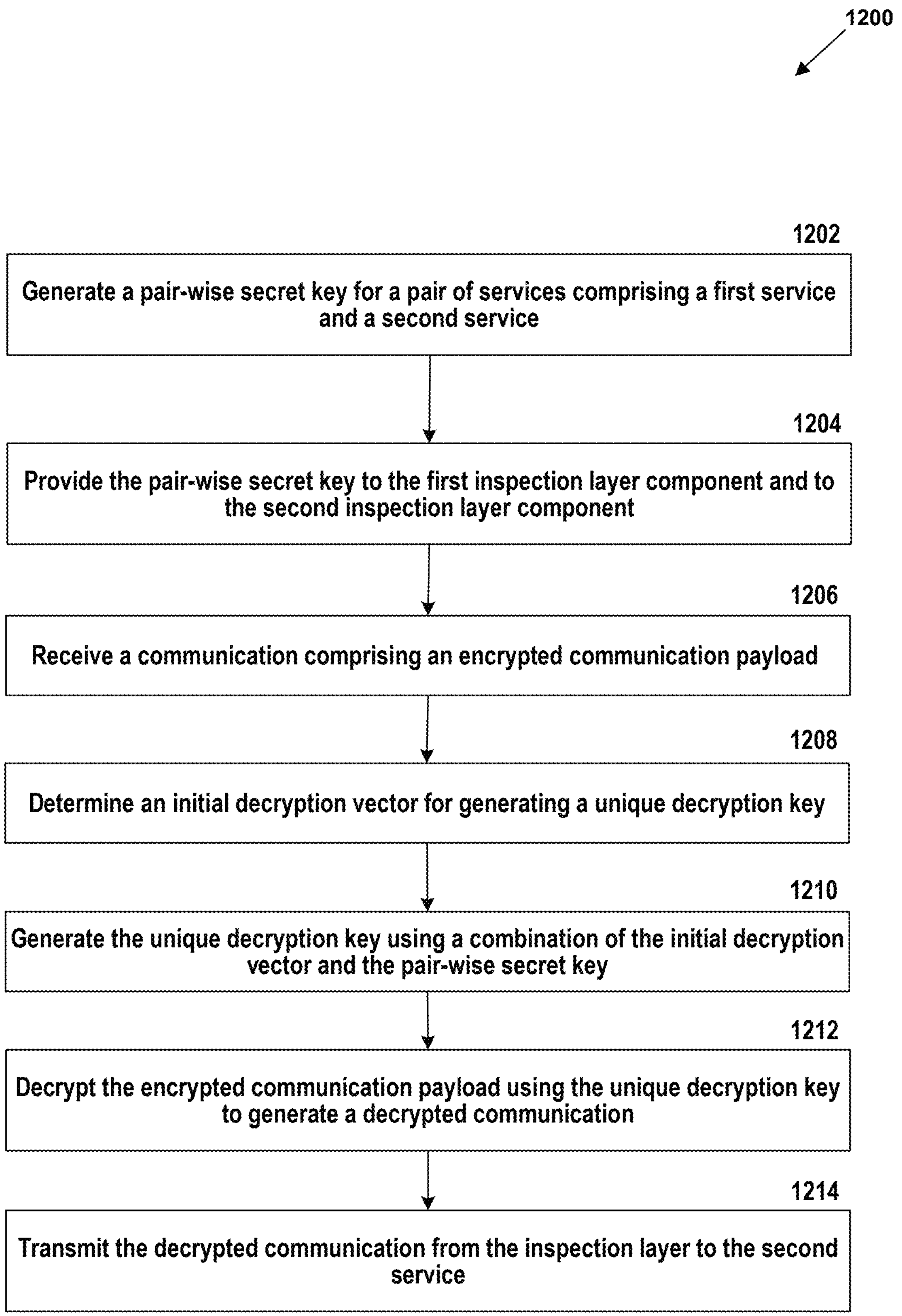

*FIG. 12*

ZERO-TRUST LAYER SEVEN ENCRYPTION

BACKGROUND

In recent years, use of various computing environments has become widespread. For example, use of on-premises environments in combination with cloud environments has become common. However, interoperability between these different environments may be difficult to accomplish due to different authorization and authentication mechanisms. For example, on-premises environments may be controlled by internal technology departments with credentials given out for appropriate users. Cloud environments may be controlled by technology vendors with credentials supplied differently. This problem may be exacerbated where services are involved. For example, one service may use data supplied by another service. If one of the services is in the cloud and the other service is on premises, it may be very difficult to authorize the other service to request data.

SUMMARY

A system for securing service to service communications described herein executes instructions to perform various operations through an inspection layer. The system may generate a pair-wise secret key for two services, where one service operates in one environment and another service operates in a different environment. For example, one service may operate in a cloud environment and the other in an on-premises environment, with each service having its own inspection layer component. The system may provide the pair-wise secret key to both inspection layer components. When the system receives an encrypted communication from the first service at the second inspection layer component (e.g., associated with the second service), it may determine an initial decryption vector that is unique for each communication between the services. The system may then generate a unique decryption key by combining the initial decryption vector with the pair-wise secret key, ensuring each communication has its own distinct decryption key. The system may then decrypt the encrypted communication payload using this unique decryption key to produce a decrypted communication. Finally, the system may transmit the decrypted communication from the inspection layer (e.g., from the second inspection layer component) to the second service for processing. This approach may ensure that each communication is independently secured, as the unique decryption keys generated from different initial decryption vectors cannot be used to decrypt other communications between the services. The use of unique initial decryption vectors for each communication may prevent replay attacks by making previously intercepted encrypted payloads unusable for subsequent communications, thereby maintaining the security and integrity of each individual data exchange.

According to an aspect of the present disclosure, a system for securing communications is provided. The system may include an inspection layer component that may perform operations described herein. The inspection layer component may generate, at an inspection layer, a pair-wise secret key for a pair of services including a first service and a second service, The pair-wise secret key may be provided to the first inspection layer component managing encryption for the first service and to the second inspection layer component managing encryption for the second service. One of the inspection layer components (e.g., the second inspection layer component) may receive a communication including an encrypted communication payload, determining an initial decryption vector for generating a unique decryption key, generating the unique decryption key using a combination of the initial decryption vector and the pair-wise secret key, decrypting the encrypted communication payload using the unique decryption key to generate a decrypted communication, and transmitting the decrypted communication from the inspection layer to the second service.

The system may establish a secure communication channel between two different computing environments by creating a shared cryptographic key. An inspection layer component may generate a pair-wise secret key for a pair of services including a first service and a second service, where the first service is located within a cloud environment and the second service is located within an on-premises environment and where the first service is associated with a first inspection layer component and the second service is associated with a second inspection layer component. For example, the inspection layer component may use elliptic curve cryptography to generate a unique 256-bit Advanced Encryption Standard (AES) secret key that will be shared between a customer service application running in Amazon Web Services and an account database service running in an internal data center.

The system may distribute the shared cryptographic key to security components that will handle encryption and decryption operations. An inspection layer component may provide the pair-wise secret key to the first inspection layer component and to the second inspection layer component. For example, the inspection layer component may securely transmit the AES secret key to both the cloud-based security filter and the on-premises security filter through encrypted channels, allowing both components to perform cryptographic operations.

The system may intercept and process encrypted data transmissions between services in different environments. An inspection layer component may receive, from the first service at the second inspection layer component associated with the second service, a communication including an encrypted communication payload. For example, when the cloud-based customer service application sends encrypted customer account data to the on-premises database service, the on-premises security filter may intercept this encrypted message before it reaches the database service.

The system may extract a unique parameter from each communication that ensures every message has a different decryption key. An inspection layer component may determine, using the communication, an initial decryption vector for generating a unique decryption key, where the unique decryption key is used to decrypt the encrypted communication payload. The initial decryption vector is different for each communication between the first service and the second service. For example, the inspection layer component may extract a 96-bit randomly generated initialization vector from the message header that was created specifically for this single communication session.

The system may create a unique cryptographic key for each individual message by combining the shared secret with the unique parameter. An inspection layer component may generate the unique decryption key using a combination of the initial decryption vector and the pair-wise secret key. The unique decryption key is different for each communication between the first service and the second service. For example, the inspection layer component may concatenate the 96-bit initialization vector with the 256-bit AES secret key and apply a key derivation function to produce a unique 256-bit decryption key that can only decrypt this specific message.

The system may convert encrypted data back into readable form using the unique cryptographic key. An inspection layer component may decrypt the encrypted communication payload using the unique decryption key to generate a decrypted communication. For example, the inspection layer component may apply AES-GCM decryption algorithm using the unique decryption key to convert the encrypted customer account data back into plain text format that the database service can process.

The system may deliver the decrypted data to the intended recipient service for normal processing. An inspection layer component may transmit the decrypted communication from the inspection layer to the second service. The second service processes the decrypted communication. For example, the inspection layer component may forward the decrypted customer account data to the database service, which then processes the account lookup request and prepares a response containing the requested customer information.

According to other aspects of the present disclosure, the system may include one or more of the following features. The system may handle return communications by encrypting response data from the second service back to the first service. The system may receive, from the second service at the second inspection layer component associated with the second service, a response communication including an unencrypted response payload. The system may generate a new initial encryption vector, where the new initial encryption vector corresponds to a new initial decryption vector, and where the new initial decryption vector is used with the pair-wise secret key to generate a new decryption key. The new initial decryption vector may be different from the initial decryption vector. The system may generate a new encryption key using the new initial encryption vector and the pair-wise secret key. The system may encrypt the unencrypted response payload using the new encryption key to generate a new encrypted payload. The system may transmit the new encrypted payload from the second inspection layer component to the first inspection layer component, where the first inspection layer component decrypts the new encrypted payload using the new initial encryption vector and the pair-wise secret key.

The system may include the unique parameter together with the encrypted data for decryption purposes. The new initial encryption vector may be transmitted together with the new encrypted payload.

The system may track communications for monitoring and auditing purposes. The system may generate a new tracking identifier associated with the communication, where the new tracking identifier is generated for tracking progress of the communication. The system may transmit the new tracking identifier to a tracking database.

The system may extract the unique parameter directly from the communication message structure. The system may extract, from the communication, a data field storing the initial decryption vector, where the initial decryption vector within the communication is different than other initial decryption vectors within other communications between the first service and the second service. The system may store the initial decryption vector.

The system may derive the unique parameter from tracking information associated with the communication. The system may retrieve, from a tracking database, a tracking identifier associated with the communication, where the tracking identifier is generated for tracking progress of the communication. The system may input the tracking identifier associated with the communication into a predetermined vector generation routine to generate the initial decryption vector.

The system may generate the unique parameter from the communication content itself. The system may generate a key value from the communication or from one or more predetermined portions of the communication. The system may input the key value into a predetermined vector generation routine to generate the initial decryption vector.

The system may combine the unique parameter and shared secret using simple concatenation methods. The system may concatenate the initial decryption vector and the pair-wise secret key when generating the unique decryption key using the combination of the initial decryption vector and the pair-wise secret key.

The system may selectively process only communications that contain encrypted data. The system may detect, using the second inspection layer component based on a flag within the communication, whether the communication has the encrypted communication payload. Based on determining that the communication has the encrypted communication payload, the system may intercept the communication, where the first service and the second service communicate directly with each other, and the inspection layer may intercept each communication between the first service and the second service via a communication filter. Based on determining that the communication does not have the encrypted communication payload, the system may refrain from intercepting the communication.

In some implementations, a mechanism is disclosed herein for cross-platform authorization and authentication. An authorization system may be used to perform operations described herein. In particular, a server (e.g., an authorization server) may receive an authorization request to generate an authorization token for a service. The authorization request may include an indication of a service public key associated with the service and an encrypted service account token associated with the service. Furthermore, the encrypted service account token may be generated by encrypting a service account token using a first service key. The first service key may be generated based on a client private key and a server public key. In addition, the client private key may be associated with a requesting device hosting the service. The requesting device may be an end user device or another server hosting the service.

One example to describe the environment may include a cloud service that interfaces with user devices needing information from an on-premises service. In particular, a mobile device may be executing an application that displays, to the user, account information. The mobile device may be communicating with the cloud environment and in particular with a server within the cloud environment (sometimes referred to as a requesting device). The requesting device may execute a service that may generate a request for user account information. The request may be directed to another service which resides on premises. Before this request is made/performed, either one of or both authorization and authentication need to be performed. Thus, disclosed herein is a mechanism for enabling authorization between different environments (e.g., an on-premises environment and a cloud environment). Thus, the authorization request may be a request to initiate an authorization enablement protocol so that the requesting service is able to be eventually authenticated when requesting data.

When the requesting device receives the authorization request, the server may decrypt, using a second service key, the encrypted service account token. The second service key may be one that is generated based on a client public key associated with the requesting device hosting the service and a server private key associated with the server. For example, the second service key may be generated using Elliptic-Curve-Diffie-Hellman (ECDH) and the requesting device may have generated the same service key independently when encrypting the service account token in the request.

Once the encrypted service account token is decrypted, the service account information from the token can be used to generate a service identity. That is, based on the service account information, such as what entity owns and deploys the service, permissions on the service, etc., the server can put together a service identity that includes information needed to authenticate the service within a cluster and with external services. For example, the server can generate a service identity including a cluster identifier, a name space, and a deployment name. These can be obtained, for example, from the service account token. The server can generate, for the service identity, a key identifier and an access key pair comprising a private access key and a public access key.

The requesting device may then generate a service identity token which includes the service identity, the private access key, and the key identifier reformatted in a token format. By doing so, the requesting device makes the token easily ingestible by various platforms. Similarly, when the requesting device is a server hosting the service, the server may generate a server token. For example, the server token may include data such as access permissions specifying what entities (e.g., other services) or users may access either one of or both the service and the service data. In particular, the permissions can include permissions to execute programs or read, write, or delete data from the service. The server token and service identity token may be enjoined into a usage token which may then be encrypted using the second service key to form an encrypted usage token. The server may then transmit the encrypted usage token to the requesting device.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), of a given item (e.g., data), unless the context clearly dictates otherwise.

BRIEF DESCRIPTION OF FIGURES

Non-limiting and non-exhaustive examples are described with reference to the following figures.

FIG. 3A illustrates an exemplary process for encrypting a service account token, such as can be performed by a service platform prior to an authorization request, in accordance with one or more embodiments of this disclosure.

FIG. 3B illustrates an exemplary process for generating a second service key, in accordance with one or more embodiments of this disclosure.

FIG. 4A illustrates an exemplary service identity token for cross-platform authorization, in accordance with one or more embodiments of this disclosure.

FIG. 4B illustrates an exemplary usage token for cross-platform authorization, in accordance with one or more embodiments of this disclosure.

FIG. 8 illustrates an exemplary data structure for storing pair-wise keys, in accordance with one or more embodiments of this disclosure.

FIG. 9 illustrates an exemplary data structure for storing determined initial decryption vectors, in accordance with one or more embodiments of this disclosure.

FIG. 10 illustrates an exemplary data structure for storing data used in determining initial decryption vectors, in accordance with one or more embodiments of this disclosure.

FIG. 11 illustrates exemplary communication fields that may be used in generating and/or determining initial decryption vectors, in accordance with one or more embodiments of this disclosure.

FIG. 12 is a flowchart of operations for securing service to service communications, in accordance with one or more embodiments of this disclosure.

DETAILED DESCRIPTION

Figure 1:
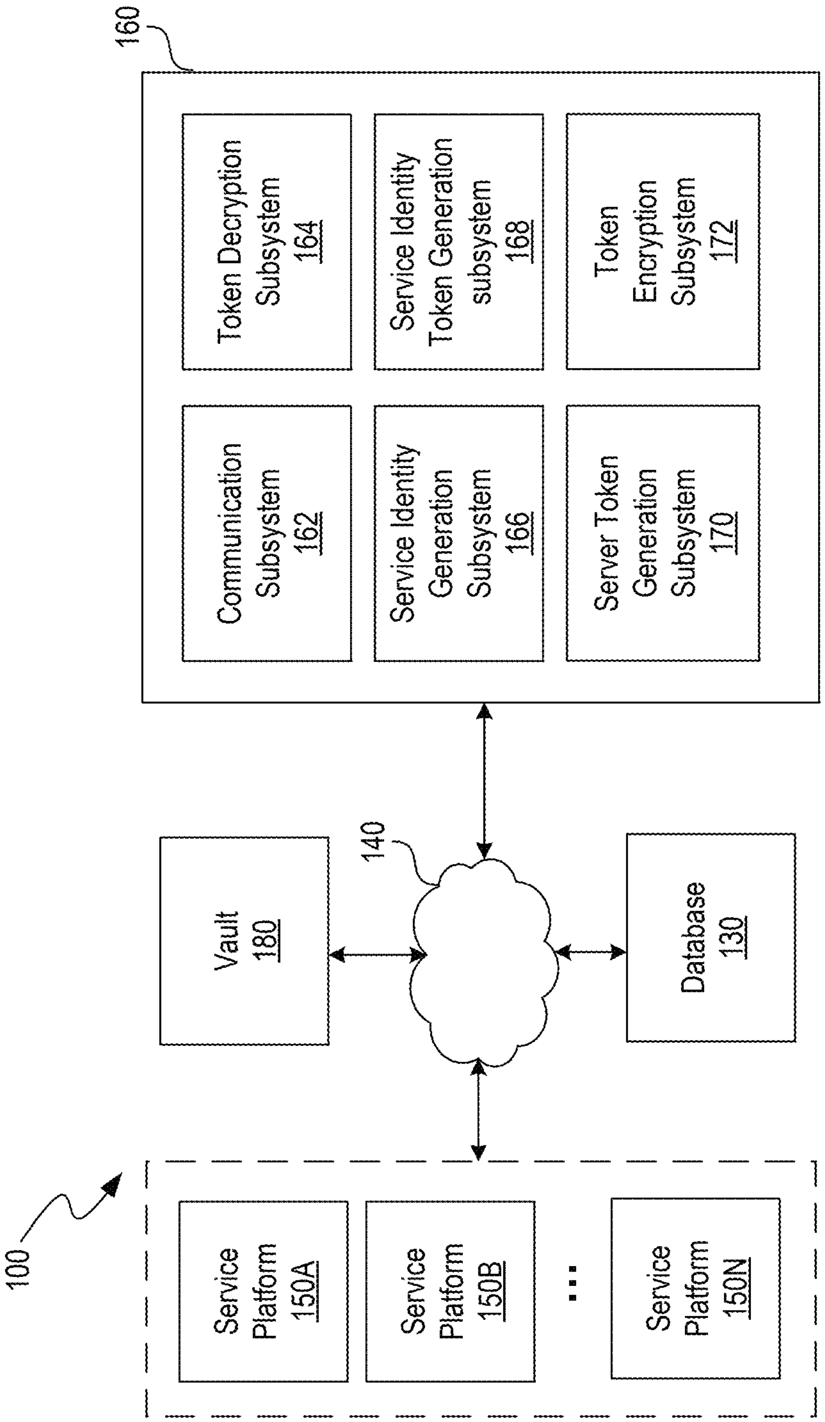
FIG. 1 shows an illustrative system for cross-platform authorization, in accordance with one or more embodiments of this disclosure.

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a system to enable interoperability between different environments in view of the available conventional approaches created significant technological uncertainty. For example, as described herein, especially where various platforms use different authentication protocols controlled by rigorous standards set by individual services, there is presently no good method for providing authentication or authorization across various different service platforms. Creating a process that enabled authentication across various incompatible platforms required addressing several unknowns in conventional approaches for security and authorization, such as the latency and bottlenecks created when large amounts of data are subjected to various protocols when requested by different services. Typically, conventional approaches to service-to-service data transfer where services are incompatible or simply use different authorization protocols cause errors and introduce a high level of latency, throughput bottleneck, and suboptimal execution time. For example, since authentication protocols are different, requests for data often fail and delays can be introduced. Because of the delay, conventional methods are often not scalable and introduce network congestion when the volume of data transmitted increases between services.

In order to mitigate this, some conventional systems rely on insecure authorization, enabling a consumer service to subscribe to a producer service to access its resources. For example, many services bypass security mechanisms to overcome this issue or create independent gateways or custom proxies between services to translate authentication methods. This not only requires more computational expenditure and is time-inefficient, but this conventional method also alienates services run by smaller clients who may not have the resources and framework to do so. Furthermore, because these methods do not solve the issue of separate authentication systems, fragmented identity management becomes an issue in conventional systems, which leads to difficulties in auditing access logs and enforcing consistent security policies, such as required by some regulations or entities. Conversely, the disclosed system incorporates centralized authorization policy enforcement while supporting real-time decision points, which mitigates the issues caused by separate authentication systems.

Additionally, as described herein, latency created further technological uncertainty, since the legacy systems often introduced latency and bottlenecks as described herein. To successfully overcome this issue, the inventors attempted various different methods for mitigating latency, including by caching keys and tokens most recently used in order to reduce the need to repeatedly perform expensive computations, database lookups, or external API calls. Instead, by having immediate access to those authentication credentials frequently used, the system can reduce duplicative resources expended when requesting data from external vaults or databases.

To overcome the technological uncertainties with enabling security for each service in their specific method, the inventors systematically evaluated multiple design alternatives. For example, the inventors attempted different architectures and encryption methods. The inventors attempted a combination of Rivest-Shamir-Adleman (RSA) and ECDH, which enabled security between the centralized platform and the individual services. The architecture described herein also allowed the inventors to identify a method which enabled individual services to execute their own security protocols, e.g., by using information transmitted in the tokens to implement security protocols and permissions specific to the service.

Thus, the inventors experimented with different methods for security and interoperability. For example, the inventors attempted various methods for increasing efficiency, such as different storage methods (e.g., caching) and architectures (e.g., fragmented, centralized) in order to overcome issues in mediating incompatible security protocols among services.

Techniques are disclosed herein for enabling cross-platform access. In particular, as described herein, interoperability between differing environments among service platforms may be difficult to accomplish due to different authorization and authentication protocols and schemes. Thus, the environment 100 is an illustrative system that can be used for mediating between different access protocols between platforms. For example, environment 100 may be used to enable various service platforms to subscribe to a producer service to access its resources. Each service platform may be issued an identity token (e.g., in the form of a JSON Web Token (JWT)) by an authorization server, which can be used downstream to verify the service's identity and thus access resources. For example, environment 100 illustrates exemplary platforms for various services, such as service platform 150A, service platform 150B, and service platform 150N. Environment 100 may further include database 130, vault 180, and cross-platform access system 160.

Cross-platform access system 160 of environment 100 may execute instructions for performing operations for enabling access across different platforms. Cross-platform access system 160 may include several subsystems, each configured to perform one or more steps of the methods described herein, such as communication subsystem 162, token decryption subsystem 164, service identity generation subsystem 166, service identity token generation subsystem 168, server token generation subsystem 170, and token encryption subsystem 172. Cross-platform access system 160 may include software, hardware, or a combination of the two. For example, cross-platform access system 160 may be hosted on a physical server or a virtual server that is running on a physical computer system. In some embodiments, cross-platform access system 160 may be configured on a user device (e.g., a laptop computer, a smartphone, a desktop computer, an electronic tablet, or another suitable user device).

As described herein, cross-platform access system 160 may be used to facilitate access across various platforms. In particular, cross-platform access system 160 may be in communication (e.g., via communication network 140) with a plurality of different service platforms, which may be executed or accessed through service platform devices associated with the service platforms. In the example of environment 100, cross-platform access system 160 is illustrated to be in communication with service platform 150A, service platform 150B, and service platform 150N through communication network 140. As described herein, a service platform may be referred to herein as a digital or physical infrastructure that provides a set of services, tools, or capabilities to entities (e.g., individual users, businesses, developers, etc.). These platforms may facilitate interactions such as transactions, as well as various functionalities. For example, a service platform may include cloud computing platforms, payment processing platforms, social media platforms, e-commerce platforms, and Internet of Things (IoT) platform such as smart home systems, and industrial automation platforms.

Figure 2:
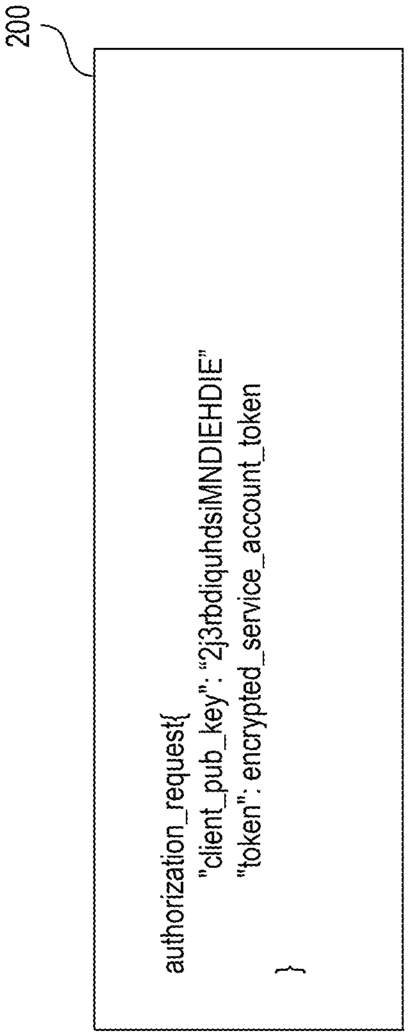
FIG. 2 illustrates an exemplary authorization request, e.g., for cross-platform authorization, in accordance with one or more embodiments of this disclosure.

Each service platform may request an authorization token to be generated for a service so that the service platforms may use the authorization token (also referred to herein as a usage token) downstream to authenticate the service and gain access to resources, e.g., protected resources such as Personally Identifiable Information (PII). For example, FIG. 2 illustrates an exemplary authorization request 200 to generate an authorization token for a service. For example, service platform 150A may generate authorization request 200 and transmit the request via communication network 140 to the cross-platform access system 160 using communication subsystem 162.

Authorization request 200 includes a public key specific to the service, "client_pub_key" as well as an encrypted service account token associated with the service. The service platform (e.g., service platform 150A) may generate the authorization request such as through an exemplary process 300 for encrypting a service account token and generating a public key (e.g., client_pub_key) during the process, as illustrated in FIG. 3A. For example, the service platform 150A may perform steps of a function "subroutine_encrypt_service_token( )" of process 300. In particular, the process includes generation of a keypair, e.g., "(private_key, public_key)=generate_keypair( )."

The keypair may include both a private key and public key. As described herein, a private key may include a secret cryptographic key that only the owner, or in this case, the generating entity, should possess, while a public key is a related key that can be freely shared with anyone and is used to encrypt messages that can only be decrypted by the corresponding private key. As described herein, a private key value and public key value may include an alphanumeric string of any length. Keypairs can be generated using any suitable algorithm, including RSA, Elliptic Curve (EC), EdDSA, etc. In some embodiments, generation of the keypair may include random generation of a private key and derivation of the public key using the private key.

The service platform 150A may then transmit the public key it derived to the cross-platform access system 160, e.g., "transmit_public_key(public_key)," and the cross-platform access system 160 may be configured to generate its own keypair using the public key sent from the service platform 150A as a seed value. The service platform 150A may wait for a message from the cross-platform access system 160 indicating that the cross-platform access system has completed generating its own keypair, e.g., "message=await channel.recv( )." For example, the cross-platform access system 160 may transmit the public key it generated using the public key the service platform 150A generated (e.g., "(server_public_key)=message"). The service platform 150A may then create a key (e.g., Advanced Encryption Standard (AES) key) based on a service platform (e.g., client) generated private key and the cross-service access platform generated (e.g., server) public key. The created key (e.g., AES key) may also be referred to herein as a first service key.

AES may refer to a symmetric encryption algorithm that uses a same key for decryption and encryption. An AES key may include a randomly generated binary string of a fixed length that is used to encrypt and decrypt data securely. Typically, AES is supported in three sizes, including 128-bit, 192-bit, and 256-bit. As described herein, the service platform 150A may create an AES key based on a service platform (e.g., client) generated private key and the cross-service access platform generated (e.g., server) public key (e.g., "AES_key=generate_key(private_key, server_public_key)"). The service platform 150A may do so by using a key derivation function (KDF) such as PBKDF2, bcrypt, Argon2, etc.

Service platform 150A may subsequently fetch the service account token "service_account_token=fetch( )" and encrypt the service account token with the key (e.g., AES key). A service account token, as referred to herein, may include an authentication credential used to grant access to specific services or resources. Unlike user tokens, which are tied to human users, the service account token may be limited to machine-to-machine communication between the cross-platform access system 160 and the service platform (e.g., service platform 150A). The service platform 150A may insert the encrypted service account token "encrypted_service_account_token=encrypt(service_account_token, server_public_key)" and the public key generated by the service platform 150A (e.g., "(private_key, public_key)=generate_keypair( )") into the authorization request. For example, the "client_pub_key" of authorization request 200 may be the public key generated by the service platform 150A while the "encrypted_service_account_token" may be the encrypted service account token.

As described herein, communication subsystem 162 of cross-platform access system 160 may be used to receive the authorization request. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the data, or a pointer to the data in memory, to other subsystems such as token decryption subsystem 164, service identity generation subsystem 166, service identity token generation subsystem 168, server token generation subsystem 170, and token encryption subsystem 172. Communication subsystem 162 may further be configured to transmit and receive other data such as for transmission of an encrypted usage token responsive to the request as described further herein.

The authorization request 200 may be passed, or a pointer to the data may be passed to the token decryption subsystem 164. The token decryption subsystem may extract the encrypted service account token and decrypt the encrypted service account token to obtain the service account token. In order to decrypt the encrypted service account token, the system may first generate a key to do so. According to some embodiments, the key may be generated to be identical to the first service key used to encrypt the service account token at the service platform. For example, the cross-platform access system 160 and service platform 150A may be enabled to generate the same service key (e.g., AES key) even though they do not communicate the service key between them. In particular, the cross-platform access system 160 and service platform 150A may utilize Elliptic-Curve-Diffie-Hellman (ECDH) or other suitable alternatives (e.g., Diffie-Hellman Key Exchange (DHKE)) to securely establish a shared secret key over an insecure channel.

As described above, the service platform may generate its own private key initially "(private_key, public_key)=generate_keypair( )." As described herein, the process of generating the keypair may begin with generation of the private key, and the service platform may then derive a public key "public_key" by multiplying the private key with a known elliptic curve generator point. The public key may be transmitted to the cross-platform access system 160, "transmit_public_key(public_key)." The cross-platform access system 160 may generate its own keypair. In particular, the cross-platform access system 160 may generate its own private key and multiply using an elliptic curve generator point to generate its public key. The cross-platform access system 160 may transmit its public key to the service platform.

In this way, both the cross-platform access system 160 and the service platform 150A may have the other's public key, while keeping the private key generated thereon. For example, the cross-platform access system 160 may have the private key generated thereon and the public key generated on the service platform 150A. The service platform 150A may have access to the private key generated on the service platform and the public key generated on the cross-platform access system 160.

Since multiplication on elliptic curves is commutative, both parties derive the same shared key. In particular, as described with respect to FIG. 3A, the first service key independently generated on the service platform is generated using the private key generated on the service platform and the public key generated on the cross-platform access system 160. The second service key independently generated on the cross-platform access system 160 but having the same value as the first service key is generated using the private key generated on the cross-platform access system 160 and the public key generated on the service platform.

In particular, the second service key independently generated on the cross-platform access system 160 may be generated using process 310 illustrated in FIG. 3B. The cross-platform access system 160 may perform functions from subroutine_generate_second_service_key( ) to generate or otherwise obtain the second service key. In particular, the cross-platform access system 160 may first attempt to fetch the second service key, e.g., if the second service key is preexisting ("try: AES_key=fetch( )"). If the second service key cannot be fetched, the system may then attempt to generate the second service key by performing ECDH using its private key and the public key transmitted from the service platform, e.g., "AES_key=generate_key(server_private_key, client_pub_key)."

If doing so fails, it may mean that the cross-platform access system 160 did not generate and transmit its own keypair as described herein. Thus, the cross-platform access system 160 may generate its own keypair, e.g., "(server_private_key, server_public_key)=generate_keypair(client_pub_key)" such as by using the service platform public key as a seed. The cross-platform access system 160 may then transmit the public key it generated to the service platform, e.g., "transmit_public_key(server_public_key)." Then the cross-platform access system 160 can generate the service key (e.g., AES key) as described herein. Once the service key is generated, the cross-platform access system 160 can cache the service key for future lookups (e.g., "cache (AES_key, client_pub_key)").

The token decryption subsystem 164 may use the second service key to decrypt the encrypted service token. As described herein, since the second service key has an equivalent value to the first service key independently generated by the cross-platform access system, the second service key can be used to decrypt the encrypted service account token, which was encrypted using the first service key generated at the service platform. For example, the service account token may be decrypted by reversing the encryption process. As described herein, the key may be an AES key, such that the same key may be used for encryption and decryption.

The token decryption subsystem 164 may pass the service account token, or a pointer to the data in memory, to the service identity generation subsystem 166. The service identity generation subsystem 166 may generate, based on the service account token, a service identity for the service. According to some embodiments, the service identity may include a cluster identifier, a name space, and a deployment name. The cluster identifier, name space, and deployment name may be retrieved from the service account token. As referred to herein, a cluster identifier may include a collection of computing resources such as servers, virtual machines, or containers that work together to run applications efficiently. A name space as referred to herein may include a logical separation within a cluster that helps to organize and isolate different workloads. A deployment name may refer to a unique identifier for a deployment resource within a namespace that allows management of the deployment in commands and configuration.

The service identity generation subsystem 166 may generate, for the service identity, a key identifier and an access key pair comprising a private access key and a public access key. According to some embodiments, the system may insert the private access key into a key vault associated with the service identity and cache the key identifier and the public access key. For example, the system may cache the keypair in a key management service (KMS) runtime and may generate a key identifier (KID) which can be used to identify the keypair during a lookup. The keypair may be generated using techniques described herein. The system may use communication subsystem 162 to insert the private key in the vault 180 with respect to the service identity (e.g., associated with the service identity). Alternatively or additionally, the system may use communication subsystem 162 to insert the KID, KMS generated public key, and the service identity into the database 130.

The private key, key identifier, cluster identifier, the name space, and/or the deployment name for the service may be passed from the service identity generation subsystem 166 to service identity token generation subsystem 168. Alternatively or additionally, a pointer to the data in memory may be passed. The service identity token generation subsystem 168 may use the data to generate a service identity token. For example, FIG. 4A illustrates an exemplary service identity token 400 for cross-platform authorization, in accordance with one or more embodiments of this disclosure. For example, the cluster identifier may be "cluster_3" referring to a 3rd cluster from a plurality of clusters available. The name space "my-name-space" may refer to a name space within the third cluster. Deployment name "e-commerce service" may refer to the service that is deployed on the name space. In the example of FIG. 4A, the service may be for e-commerce. Exemplary service identity token 400 also includes, as described herein, the private access key and a key identifier.

The service identity token generation subsystem 168 may pass the service identity token, or a pointer to the data in memory, to server token generation subsystem 170. The server token generation subsystem 170 may generate a server token comprising access permissions for the service. As referred to herein, access permissions may define what entities may access a resource and what actions they can take. Permission levels may indicate who may read, write, execute, or delete on the resource. Role-based access control may assign permissions based on roles, such as for administrators, editors, viewers, or guests. Other access models include access control models such as Attribute-Based Access Control (ABAC) or Mandatory Access Control (MAC).

According to some embodiments, generating the service account token including the access permissions for the service may include retrieving the access permissions for the service and transforming the access permissions into token format. The server token generation subsystem 170 may then add the access permissions to the service account token, and thus into the server token. For example, token formats that may be used may include JSON Web Token (JWT), OAuth Access token, Kerberos Token, SAML token, etc. In one example, the token format is JWT format, and the token may include a claims section in the payload that specifies user roles, permissions, or scopes. An access permission such as "everyone has admin roles and should be able to read write and delete" can be transformed into the JWT token format to include, for example, "role: 'admin" and "permissions: ['read', 'write', 'delete']." Transformation can be done using one or more algorithms, such as operator developed algorithms. Alternatively or additionally, the system may utilize machine learning to translate plaintext into token format. These permissions may be incorporated into the JWT in the payload section.

The server token generation subsystem 170 and/or service identity token generation subsystem 168 may pass the server token and the service identity token to the token encryption subsystem 172. Alternatively, or additionally, server token generation subsystem 170 and/or service identity token generation subsystem 168 may pass a pointer to the data in memory to the token encryption subsystem 172. The token encryption subsystem 172 may encrypt the server token and the service identity token using the second service key into an encrypted usage token. The server token generation subsystem 170 may pass the encrypted usage token to the communication subsystem 162 from which the encrypted usage token can be transmitted, such as to the requesting device (e.g., service platform 150A). As described herein, since the second service key generated at the cross-platform access system 160 is the same as the first service key generated independently at the service platform, the requesting device is enabled to decrypt the encrypted usage token using the first service key. FIG. 4B is an example of a usage token 410 (e.g., unencrypted). The usage token includes the service identity token 400 and additionally may include the server token including permissions, as described herein.

Thus, in future uses, when the cross-platform access system 160 receives a validation request for the service such as from a remote device, the cross-platform access system 160 may find the public access key associated with the service and provide it to the remote device so that the remote device may validate the service identity token. In particular, the validation request may include the key identifier and the service identity token. The cross-platform access system 160 may determine, based on the key identifier, the public access key associated with the service, such as through a lookup as described herein. The cross-platform access system 160 may then transmit the public access key associated with the service to the remote device via communication subsystem 162.

According to some embodiments, the system may determine that the key identifier is not found in cache memory. For example, a cache lookup may yield a cache miss indicating that the data is not found in the cache. In this case, the system may generate a vault request for the public access key, wherein the vault request includes the key identifier. The vault request may be transmitted via communication subsystem 162 to vault 180. The vault may identify the public access key and transmit it to cross-platform access system 160. Communication subsystem 162 may receive the public access key from the key vault and cache the public access key and the key identifier in the cache memory.

According to some embodiments, a service may seek to refresh a usage token such as when the service platform identifies that a usage token is close to expiration. For example, generating the server token comprising the access permissions for the service may further include receiving a token refresh request comprising the encrypted service account token and the client (e.g., service) public key. The token decryption subsystem 164 may be configured to decrypt the encrypted service account token to retrieve the service identity and generate a new key identifier and a new service identity token using the client public key. The communication subsystem 162 may then transmit the new service identity token and the new key identifier to the requesting device, e.g., the service platform 150A. In some examples, determining that the usage token is close to expiration may include determining that the usage token was generated more than a predetermined amount of time in the past.

Figure 5:
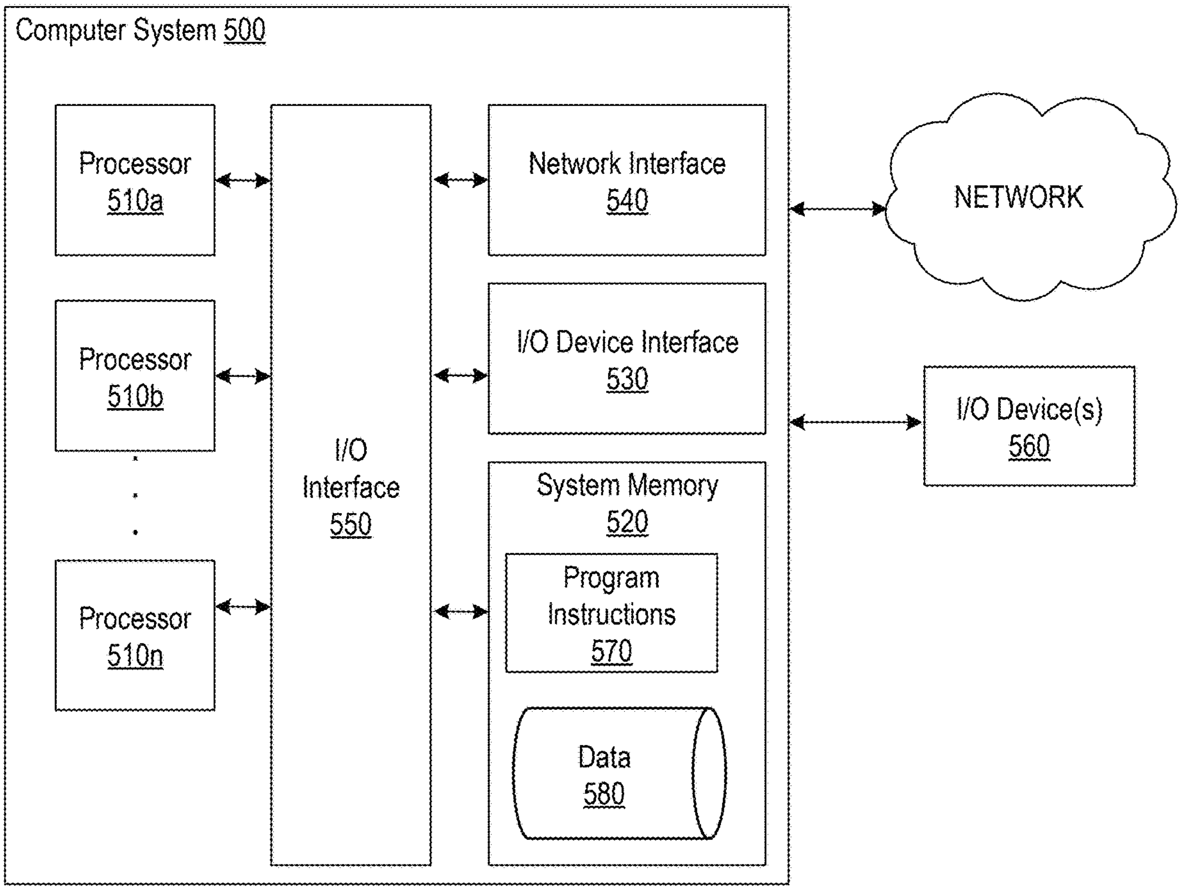
FIG. 5 illustrates a computing system that can be used for cross-platform authorization, in accordance with one or more embodiments of this disclosure.

FIG. 5 shows an example computing system that may be used in accordance with some embodiments of this disclosure. In some instances, computing system 500 is referred to as a computer system 500. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510*a*-510*n*) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 520). Computing system 500 may be a uni-processor system including one processor (e.g., processor 510*a*), or a multiprocessor system including any number of suitable processors (e.g., 510*a*-510*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

The I/O device interface 530 and I/O devices 560 may be used to enable manipulation of the three-dimensional model as well. For example, the user may be able to use I/O devices such as a keyboard and touchpad to indicate specific selections for nodes, adjust values for nodes, select from the history of machine learning models, select specific inputs or outputs, and/or the like. Alternatively or additionally, the user may use their voice to indicate specific nodes, specific models, and/or the like via the voice recognition device and/or microphones.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the internet, a LAN, a WAN, a cellular communications network, or the like.

System memory 520 may be configured to store program instructions 570 or data 580. Program instructions 570 may be executable by a processor (e.g., one or more of processors 510*a*-510*n*) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages.

A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510*a*-510*n*) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510*a*-510*n*, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Figure 6:
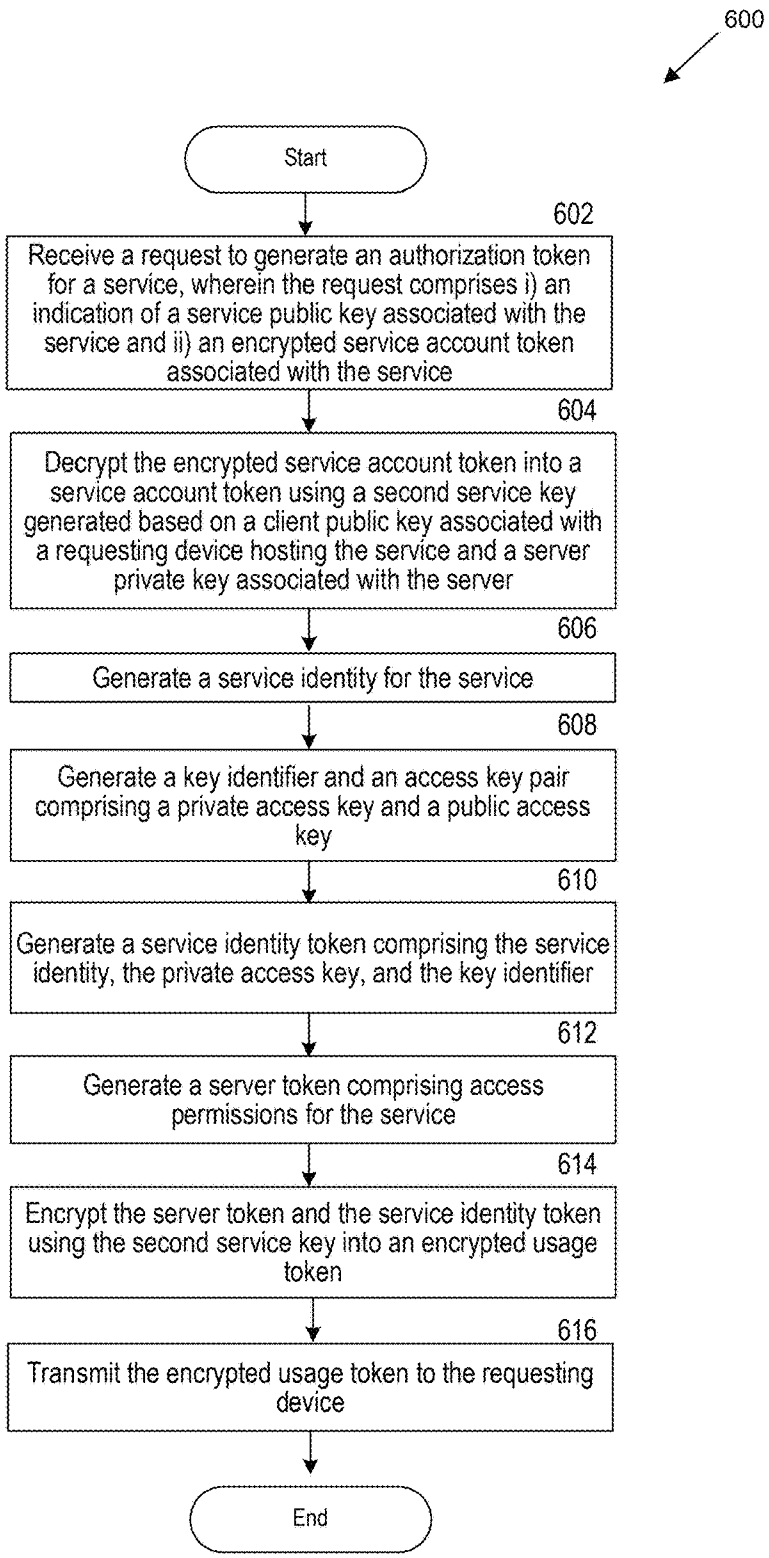
FIG. 6 is a flowchart of operations for cross-platform authorization, in accordance with one or more embodiments of this disclosure.

FIG. 6 is a flowchart 600 of operations for cross-platform access control, in accordance with one or more embodiments of this disclosure. The operations of FIG. 6 may use components described in relation to FIG. 5. In some embodiments, cross-platform access system 160 may include one or more components of computer system 500.

At operation 602, one or more of processors 510*a*-510*n* may be used to receive a request to generate an authorization token for a service, wherein the request comprises i) an indication of a service public key associated with the service and ii) an encrypted service account token associated with the service. One or more of processors 510*a*-510*n* may receive such requests over communication network 140 using network interface 540.

At operation 604, one or more of processors 510*a*-510*n* may further decrypt the encrypted service account token into a service account token using a second service key generated based on a client public key associated with a requesting device hosting the service and a server private key associated with the server. At operation 606, one or more of processors 510*a*-510*n* may generate a service identity for the service. According to some embodiments, the processor(s) may perform the generation based on the service account token. The service identity may include a cluster identifier, a name space, and a deployment name.

At operation 608, one or more of processors 510*a*-510*n* may generate a key identifier and an access key pair comprising a private access key and a public access key. For example, the processor(s) may generate the identifier and key pair for the service identity. At operation 610, one or more of processors 510*a*-510*n* may generate a service identity token comprising the service identity, the private access key, and the key identifier. Further, at operation 612, the processor(s) may generate a server token comprising access permissions for the service.

At operation 614, one or more of processors 510*a*-510*n* may encrypt the server token and the service identity token using the second service key into an encrypted usage token. At operation 616, one or more of processors 510*a*-510*n* may transmit the encrypted usage token to the requesting device. According to some embodiments, the requesting device may be configured to decrypt the encrypted usage token using a first service key.

Modern computing environments face challenges when securing communications between services, particularly in hybrid cloud deployments where services may be distributed across multiple platforms and environments. Traditional security approaches may not work for hybrid environments because authentication and authorization systems, in many instances, are different from environment to environment, with different individuals responsible for authorization systems. The disclosed system may address these challenges by providing application-layer encryption that may protect data throughout the communication lifecycle between services. The system may operate independently of underlying transport protocols and may provide granular control over which communications require encryption based on configurable policies. In some cases, the system may enable services to communicate securely without requiring modifications to existing business logic or application code.

The system may utilize a framework that may intercept communications between services and may apply encryption and decryption operations transparently to the communicating services. This approach may allow organizations to implement end-to-end encryption for service-to-service communications while maintaining performance characteristics suitable for high-throughput microservices architectures. The system may generate unique encryption parameters for each communication session, which may help ensure that compromise of one communication does not affect the security of other communications. In addition, this approach allows use with currently deployed services without changing any infrastructure or code of these services or microservices.

In hybrid cloud environments, the system may provide vendor-agnostic encryption capabilities that may operate consistently across different cloud platforms and/or on-premises infrastructure. The system may establish secure communication channels between services regardless of their physical or virtual location, enabling organizations to maintain control over their encryption policies and key management practices. The system may support selective encryption policies that may allow administrators to specify which types of communications require encryption based on data sensitivity, service relationships, or other configurable criteria.

The disclosed approach may differ from conventional transport layer security mechanisms by operating at the application layer, where the system may have access to structured data payloads and may apply encryption based on content analysis and policy evaluation. The system may maintain performance characteristics by utilizing efficient symmetric encryption algorithms combined with secure key exchange mechanisms that may minimize computational overhead while providing strong security guarantees for sensitive data communications.

Figure 7:
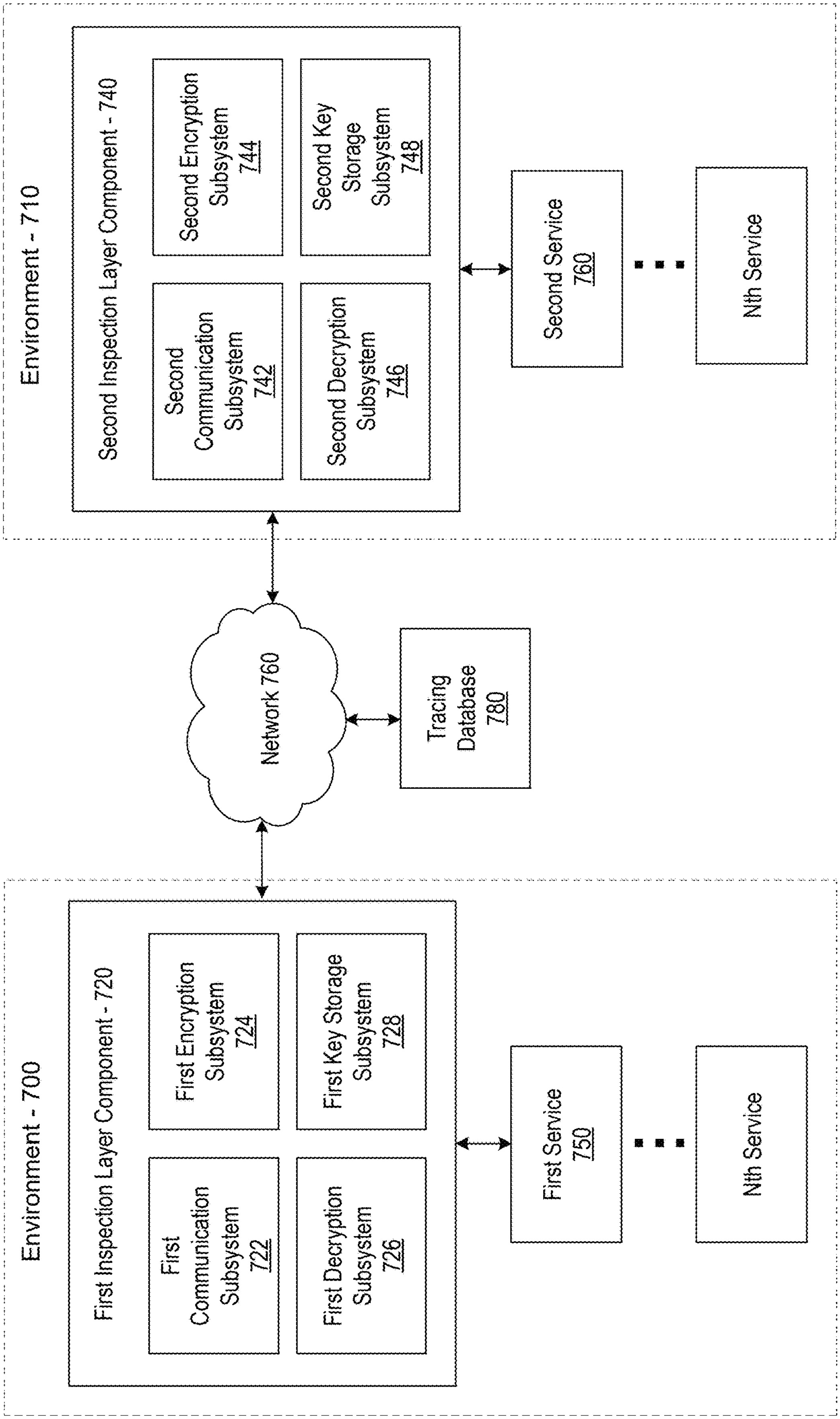
FIG. 7 shows an illustrative system for securing service to service communications, in accordance with one or more embodiments of this disclosure.

The system may enable securing service-to-service communications across different computing environments in a multi-environment architecture. Referring to FIG. 7, the system may include a first environment 700 and a second environment 710 that may be connected through a network. The first environment 700 may represent a cloud-based computing environment, while the second environment 710 may represent an on-premises (or another cloud) computing environment. Each environment may include specialized components for intercepting and processing communications between services to provide application-layer encryption capabilities.

The first environment 700 may include a first inspection layer component 720 that may operate as an intermediary for securing communications. The first inspection layer component 720 may include multiple subsystems for handling different aspects of the encryption and decryption process. A first communication subsystem 722 may manage the transmission and reception of data between services and external systems. A first encryption subsystem 724 may handle the encryption of outgoing communications from services within the first environment 700. A first decryption subsystem 726 may process incoming encrypted communications and convert them back to plaintext for consumption by services. A first key storage subsystem 728 may maintain cryptographic keys and related security parameters needed for the encryption and decryption operations, as well as other data.

Similarly, second environment 710 may include a second inspection layer component 740 with corresponding subsystems for securing communications. A second communication subsystem 742 may facilitate data exchange between second environment 710 and external systems. A second encryption subsystem 744 may encrypt communications originating from services in second environment 710. A second decryption subsystem 746 may decrypt incoming encrypted communications for processing by local services. A second key storage subsystem 748 may store cryptographic materials and security parameters required for the encryption and decryption processes within second environment 710.

The system may include a first service 750 operating within first environment 700 and a second service 760 operating within second environment 710. First service 750 may represent any application or microservice that requires secure communication with services in other environments. Second service 760 may similarly represent an application or microservice that needs to exchange data securely with external services. The inspection layer components may operate transparently to these services, intercepting communications without requiring modifications to the service business logic or application code.

The system may generate a pair-wise secret key for securing communications between the first service 750 and the second service 760. This pair-wise secret key generation may occur at an inspection layer that may coordinate between the first inspection layer component 720 and the second inspection layer component 740. The pair-wise secret key may be unique to the specific pairing of the first service 750 and the second service 760, ensuring that communications between different service pairs use different cryptographic materials. The system may utilize elliptic curve cryptography, such as AD curve algorithms that may function similarly to Elliptic Curve Diffie-Hellman (ECDH) key agreement protocol, for generating shared secrets between services. For example, each inspection layer component may generate an elliptic curve key pair, exchange public keys, and derive a shared secret through point multiplication operations on the elliptic curve.

The cross-platform authorization and authentication system may be adapted to generate pair-wise secret keys by leveraging the existing ECDH key exchange mechanisms already established between service platforms and the cross-platform access system. Instead of generating authorization tokens for service authentication, the system may utilize the same cryptographic infrastructure where each service platform generates an elliptic curve key pair and exchanges public keys with other service platforms through the centralized authorization server. The system may coordinate the key exchange process by facilitating the secure transmission of public keys between service platforms and deriving shared secrets through point multiplication operations on the elliptic curve.

The pair-wise secret key generation process may involve the service identity generation subsystem 166 and the existing key management infrastructure to create unique cryptographic materials for each service pairing. When two services need to establish secure communication, the system may use the service account tokens and service identities to authenticate the services, then generate elliptic curve key pairs for each service. The system may combine the private key from one service with the public key from another service using the same ECDH methodology currently employed for encrypting service account tokens, resulting in a shared secret that both services can independently derive without direct key exchange.

This approach may provide enhanced security for service-to-service communications by eliminating the need for token-based authentication flows while maintaining the cross-platform compatibility of the original system. The pair-wise secret keys may be stored in the existing vault 180 and database 130 infrastructure, with the key storage subsystems managing the cryptographic materials similarly to how they currently handle access keys and service identity tokens. The system may utilize the same caching mechanisms and key management practices to ensure efficient retrieval and rotation of pair-wise secret keys, while the communication subsystem 162 may coordinate the secure distribution of these keys to the appropriate inspection layer components in different environments.

The system may provide the pair-wise secret key to both the first inspection layer component 720 and the second inspection layer component 740 for use in encryption and decryption operations. The first key storage subsystem 728 may store the pair-wise secret key along with associated metadata such as service identifiers and key expiration information. The second key storage subsystem 748 may similarly maintain the pair-wise secret key and related parameters. The inspection layer components may implement caching mechanisms to store frequently used cryptographic materials locally, reducing the need for repeated key retrieval operations from external key management systems.

When first service 750 initiates communication with second service 760, the system may receive the communication at second inspection layer component 740. The communication may include an encrypted communication payload that has been processed by the first inspection layer component 720 before transmission. The second communication subsystem 742 may intercept the incoming communication and route the communication to appropriate processing subsystems within second inspection layer component 740. The inspection layer components may operate as filters or interceptors that may function independently of the microservice business logic using an injector pattern, allowing the security framework to be deployed without modifying existing service code.

The system may determine an initial decryption vector from the communication for generating a unique decryption key. The initial decryption vector may be a 96-bit random string that may be generated for each transaction to ensure uniqueness across different communications. The initial decryption vector may be different for each communication between first service 750 and second service 760, preventing replay attacks and ensuring that compromise of one communication does not affect the security of other communications. In some implementations, the system may extract the initial decryption vector from a data field within the communication, where the initial decryption vector may be transmitted alongside the encrypted payload.

In some implementations, the system may retrieve a tracking identifier from a tracing database 780 or another suitable database and input the tracking identifier into a predetermined vector generation routine to generate the initial decryption vector.

The system may implement comprehensive transaction tracking mechanisms through the use of trace identifiers and tracking identifiers that may enable monitoring, auditing, and correlation of communications across distributed service environments. The tracing database 780 may serve as a centralized repository for storing tracking information that may be used to monitor the progress of communications between services and maintain audit trails for security and compliance purposes.

Trace identifiers may function as unique markers that may be assigned to individual communications or communication sessions between services. Each trace identifier may be generated using various methodologies, including sequential numbering schemes, timestamp-based generation algorithms, or cryptographic hash functions that may ensure uniqueness across the distributed system. The trace identifiers may enable correlation of related events and operations that occur during the processing of a single communication, allowing system administrators and security personnel to track the complete lifecycle of data exchanges between services.

The system may generate trace identifiers at multiple points during the communication process. When a communication is initiated between first service 750 and second service 760, first inspection layer component 720 may generate an initial trace identifier that may be associated with the outgoing communication. This trace identifier may be embedded within the communication metadata or transmitted as part of the communication headers, enabling downstream components to correlate related processing events. The trace identifier may persist throughout the communication lifecycle, allowing tracking of encryption operations, transmission events, decryption processes, and final delivery to the target service.

Tracking identifiers may serve as broader correlation mechanisms that may encompass multiple related communications or transaction flows between services. A single tracking identifier may be associated with a complex business transaction that involves multiple service-to-service communications, enabling end-to-end visibility of distributed transaction processing. The tracking identifiers may be generated using business logic considerations, such as customer identifiers, order numbers, or session tokens, providing meaningful correlation points for operational monitoring and troubleshooting activities.

The system may utilize tracking identifiers in the generation of initial decryption vectors, as described in the predetermined vector generation routine. When the system retrieves a tracking identifier from tracing database 780, the tracking identifier may be processed through cryptographic functions or mathematical algorithms to produce deterministic initial decryption vectors. This approach may ensure that communications associated with the same tracking identifier use related but unique cryptographic parameters, while maintaining the security properties required for preventing replay attacks and ensuring communication independence.

Tracing database 780 may store comprehensive tracking information in structured data formats that may facilitate efficient querying and analysis of communication patterns. The tracking data structure 1000 may include communication identifier fields 1002 that may link individual communications to their associated trace identifiers, tracking identifier fields 1004 that may provide broader transaction correlation, span identifier fields 1006 that may enable hierarchical tracking of nested operations, and other data fields 1008 that may contain additional metadata such as timestamps, service identifiers, and processing status information.

The system may implement distributed tracing capabilities that may enable tracking of communications across multiple environments and inspection layer components. When a communication traverses from first environment 700 to second environment 710, the trace identifier may be preserved and propagated through the inspection layer components, allowing correlation of encryption operations performed by first inspection layer component 720 with corresponding decryption operations performed by second inspection layer component 740. This distributed tracking capability may provide comprehensive visibility into cross-environment communication flows and may facilitate debugging and performance analysis of complex service interactions.

The tracking mechanisms may support real-time monitoring capabilities that may enable immediate detection of communication anomalies, security events, or performance degradation. The system may generate alerts or notifications based on tracking identifier patterns, such as unusual communication volumes between specific service pairs, extended processing times for individual communications, or failed decryption attempts that may indicate security threats or system malfunctions. The tracking identifiers may serve as correlation keys for aggregating metrics and generating reports on service communication patterns and system performance characteristics.

The system may generate the unique decryption key using a combination of the initial decryption vector and the pair-wise secret key. This combination process may involve concatenating the initial decryption vector and the pair-wise secret key to create input material for a key derivation function. The unique decryption key may be different for each communication between first service 750 and second service 760 due to the uniqueness of each initial decryption vector. The system may utilize an AES encryption algorithm with Galois/Counter Mode (GCM) and NoPadding for encrypting payloads, providing authenticated encryption with associated data capabilities.

Second decryption subsystem 746 may decrypt the encrypted communication payload using the unique decryption key to generate a decrypted communication. The decryption process may reverse the encryption operations performed by first encryption subsystem 724, converting the encrypted payload back to its original plaintext format. In some implementations, the system may detect whether the communication has an encrypted communication payload by examining a flag within the communication, such as a request header labeled 'x-ccp-enc-payload' that may be set to true to indicate that the payload is encrypted. Based on determining that the communication has the encrypted communication payload, the system may intercept the communication through a communication filter, while first service 750 and the second service 760 may communicate directly with each other under normal circumstances.

The system may transmit the decrypted communication from the inspection layer to second service 760 for processing. Second service 760 may process the decrypted communication as if the communication had been received in plaintext form, maintaining transparency of the encryption and decryption operations. The system may implement egress policies that may determine which Application Programming Interfaces (APIs) require encryption based on declarative configuration, allowing selective encryption at the API level rather than encrypting all communications indiscriminately. The encrypted payload may be formatted as a JSON Web Encryption (JWE) token with the encrypted payload as a claim, providing a standardized format for encrypted data transmission.

For response communications, the system may receive an unencrypted response payload from second service 760 at the second inspection layer component 740. Second encryption subsystem 744 may generate a new initial encryption vector that may correspond to a new initial decryption vector for the response communication. The new initial decryption vector may be different from the initial decryption vector used for the original request, ensuring that each communication direction uses unique cryptographic parameters. The system may generate a new encryption key using the new initial encryption vector and the pair-wise secret key, following similar combination processes as used for decryption key generation.

The new initial encryption vector may take various forms depending on the specific implementation requirements and security considerations of the system. In some embodiments, the new initial encryption vector may be a randomly generated binary sequence of predetermined length, such as a 96-bit, 128-bit, or 256-bit string that may be produced using cryptographically secure random number generators. The vector may be generated using hardware-based entropy sources, such as thermal noise or quantum phenomena, or through software-based pseudorandom number generators that may utilize seed values derived from system state information, timestamps, or other unpredictable data sources. In some cases, the new initial encryption vector may be derived from a combination of multiple entropy sources to enhance randomness and security properties. The vector may also incorporate deterministic elements based on communication context, such as sequence numbers or session identifiers, while maintaining sufficient randomness to prevent predictability. The system may generate the new initial encryption vector using cryptographic hash functions applied to input parameters, key derivation functions that process seed material, or specialized vector generation algorithms that may ensure appropriate statistical properties and cryptographic strength for the intended encryption operations.

The system may generate a new encryption key by combining the new initial encryption vector with the pair-wise secret key through a secure key derivation process. This generation process may involve concatenating the new initial encryption vector with the pair-wise secret key to create composite input material that may be processed through a key derivation function (KDF). The key derivation function may utilize cryptographic algorithms such as PBKDF2, HKDF, or other suitable derivation methods to transform the combined input into a cryptographically strong encryption key. The resulting new encryption key may inherit the security properties of both the unique initial encryption vector and the shared pair-wise secret key, ensuring that each response communication uses distinct cryptographic parameters while maintaining the established security relationship between the communicating services.

The new encryption key generation process may incorporate additional security measures to enhance the cryptographic strength and uniqueness of the derived key material. The system may apply salt values or additional entropy sources during the key derivation process to further randomize the output and prevent potential cryptographic attacks. In some implementations, the key derivation function may utilize multiple rounds of processing or iterative algorithms to increase computational complexity and strengthen the resulting encryption key. The generated new encryption key may be temporarily stored in memory for the duration of the encryption operation and may be securely disposed of after use to minimize exposure of cryptographic materials. This approach may ensure that each response communication benefits from fresh cryptographic parameters while maintaining compatibility with the decryption processes performed by the receiving inspection layer component.

Second encryption subsystem 744 may encrypt the unencrypted response payload using the new encryption key to generate a new encrypted payload. The system may transmit the new encrypted payload from second inspection layer component 740 to first inspection layer component 720, where first inspection layer component 720 may decrypt the new encrypted payload using the new initial encryption vector and the pair-wise secret key. The new initial encryption vector may be transmitted together with the new encrypted payload to provide first inspection layer component 720 with the necessary parameters for decryption operations.

The system may generate tracking identifiers for monitoring communication progress and maintaining audit trails, as well as for generating initial encryption/decryption vectors. A new tracking identifier may be generated and associated with each communication. Each tracking identifier may be used for tracking progress of the communication through the system. Tracing database 780 may receive and store these tracking identifiers along with associated metadata such as timestamps, service identifiers, and communication status information. The system may operate without requiring mutual Transport Layer Security (mTLS), providing a high-performance alternative that may scale better in microservices architectures by avoiding the computational overhead and certificate management complexity associated with transport-layer security protocols.

The system may utilize the new tracking identifier in various ways to generate initial encryption vectors and initial decryption vectors for cryptographic operations. In some implementations, the tracking identifier may be processed through cryptographic hash functions such as SHA-256 or SHA-3 to produce deterministic initial vectors that maintain uniqueness while enabling reproducible generation across different system components. The system may extract specific portions of the tracking identifier, such as the first 96 bits or 128 bits, and use these extracted segments directly as initial encryption vectors or initial decryption vectors. In some implementations, the tracking identifier may be combined with additional parameters such as timestamps, sequence numbers, or service identifiers through concatenation operations before being processed through key derivation functions to generate the required vectors. The system may also utilize the tracking identifier as seed material for cryptographically secure pseudorandom number generators that produce initial vectors with appropriate statistical properties and entropy characteristics. In some cases, the tracking identifier may be subjected to mathematical transformations such as modular arithmetic operations or bitwise manipulations to derive initial vectors that satisfy specific length requirements or formatting constraints. The system may implement multiple vector generation methods simultaneously, allowing different communication types or service pairs to utilize different approaches based on security policies or performance requirements.

The system may provide vendor-agnostic encryption capabilities that may not rely on cloud provider-specific key management services, providing organizations with full control over encryption policies and key management practices in hybrid environments. The system may protect data throughout its lifecycle at the application layer, addressing the 'data in use' vulnerability that may exist after Transport Layer Security (TLS) decryption when data resides in application memory or temporary storage. Authorization servers may perform service whitelisting to ensure that only authorized services may communicate with each other based on predefined policies, preventing unauthorized access attempts and maintaining security boundaries between different service domains.

The system may implement a tracking identifier-based approach for generating initial decryption vectors that may provide enhanced correlation capabilities across distributed service communications. When the system receives a communication between first service 750 and second service 760, second inspection layer component 740 may initiate a lookup process to retrieve tracking information associated with the specific communication session. The tracking identifier may serve as a unique correlation key that may link individual communications to broader transaction contexts or business processes spanning multiple service interactions.

The system may query tracing database 780 to retrieve the tracking identifier associated with the incoming communication. The tracking identifier may be generated for tracking progress of the communication through various system components and may contain metadata that may enable correlation of related operations across the distributed architecture. The tracking identifier may be structured as an alphanumeric string, a universally unique identifier (UUID), or a composite value that may incorporate temporal, sequential, or contextual information relevant to the communication session.

Upon retrieving the tracking identifier from tracing database 780, the system may input this identifier into a predetermined vector generation routine that may transform the tracking identifier into a suitable initial decryption vector. The predetermined vector generation routine may utilize various cryptographic or mathematical operations to derive the initial decryption vector from the tracking identifier input. The system may apply cryptographic hash functions such as SHA-256, SHA-3, or BLAKE2 to the tracking identifier, producing a deterministic output that may serve as the initial decryption vector. The hash function output may be truncated or extended to match the required vector length specifications for the encryption algorithm being employed.

The system may alternatively process the tracking identifier through key derivation functions that may incorporate additional parameters such as salt values, iteration counts, or context-specific information to enhance the security properties of the generated initial decryption vector. The predetermined vector generation routine may include mathematical transformations such as modular arithmetic operations, bitwise manipulations, or algebraic functions that may convert the tracking identifier into a vector format suitable for cryptographic operations. The system may ensure that the vector generation routine produces outputs with appropriate statistical properties, including sufficient entropy and uniform distribution characteristics. The routines described herein are deterministic in that the initial decryption vector may be generated and be identical to a corresponding initial encryption vector that was used in encrypting the corresponding payload.

The system may implement multiple vector generation algorithms within the predetermined routine, allowing selection of specific methods based on security policies, performance requirements, or compatibility considerations with different encryption schemes. The tracking identifier may be combined with additional contextual information such as service identifiers, environment markers, or temporal stamps before being processed through the vector generation routine. This combination approach may enhance the uniqueness and unpredictability of the generated initial decryption vectors while maintaining the correlation capabilities provided by the tracking identifier.

The system may cache frequently accessed tracking identifiers and their corresponding generated initial decryption vectors to improve performance and reduce computational overhead during high-volume communication processing. The caching mechanism may implement time-based expiration policies or usage-based eviction strategies to ensure that cached vectors remain current and secure. The system may validate the integrity of retrieved tracking identifiers before processing them through the vector generation routine, ensuring that corrupted or tampered identifiers do not compromise the security of the encryption operations.

The generated initial decryption vector may inherit correlation properties from the source tracking identifier while providing the cryptographic randomness required for secure encryption operations. The system may log the association between tracking identifiers and generated vectors for audit purposes, enabling forensic analysis and compliance reporting capabilities. The predetermined vector generation routine may be configurable to accommodate different vector length requirements, encryption algorithm specifications, or security policy mandates across various deployment environments.

The system may implement content-based vector generation mechanisms that may derive initial decryption vectors directly from the communication payload or specific data fields within the communication structure. When the system receives a communication between first service 750 and second service 760, second inspection layer component 740 may analyze the communication content to identify suitable data elements for vector generation purposes. The system may examine various portions of the communication, including header fields, metadata sections, or payload segments that may contain sufficient entropy for cryptographic vector generation.

The system may generate a key value from the communication by extracting specific data elements that may provide appropriate randomness characteristics for vector derivation. The key value generation process may involve selecting predetermined portions of the communication that may exhibit sufficient variability across different communication sessions. The system may identify data fields within the communication structure that may contain unique identifiers, timestamps, sequence numbers, or other variable elements that may serve as source material for vector generation. The selected data portions may be combined through concatenation operations or mathematical transformations to produce a composite key value that may represent the essential characteristics of the communication. The initial decryption vector may be identical to corresponding initial encryption vector. That is, the process for generating an initial encryption vector or an initial decryption vector may be identical or at least produce results that allows the use of the initial encryption vector to encrypt the payload of the communication and a corresponding initial decryption vector to decrypt that payload.

The system may apply various data extraction techniques to obtain the key value from the communication content. The system may parse structured data formats such as JSON, XML, or protocol buffer messages to identify specific fields that may contain suitable entropy sources. The system may extract binary data segments from the communication payload and convert them to appropriate formats for vector generation processing. The system may utilize regular expressions or pattern matching algorithms to identify and extract relevant data elements from unstructured communication content. The system may implement checksum calculations or hash operations on selected communication portions to generate deterministic key values that may maintain consistency across processing operations.

The system may process the generated key value through a predetermined vector generation routine that may transform the key value into a suitable initial decryption vector format. The predetermined vector generation routine may utilize cryptographic hash functions to convert the key value into a fixed-length output that may serve as the initial decryption vector. The system may apply SHA-256, SHA-3, or other cryptographically secure hash algorithms to the key value, producing deterministic outputs that may maintain the required vector properties. The hash function output may be truncated or padded to match the specific length requirements of the encryption algorithm being employed by the system.

The system may implement key derivation functions within the predetermined vector generation routine to enhance the security properties of the generated initial decryption vector. The system may incorporate salt values derived from communication metadata or system configuration parameters during the key derivation process. The system may apply multiple rounds of processing or iterative algorithms to increase the computational complexity of the vector generation operation. The system may utilize PBKDF2, HKDF, or other standardized key derivation functions to transform the key value into cryptographically strong initial decryption vectors.

The system may implement multiple key value extraction strategies to accommodate different communication formats and content types. The system may utilize header-based extraction methods for communications that may contain rich metadata in their header sections. The system may also employ payload-based extraction techniques for communications where the primary data content may provide the most suitable entropy sources. The system may combine multiple extraction approaches to generate composite key values that may incorporate data elements from various portions of the communication structure.

The system may implement sophisticated detection mechanisms to identify communications that contain encrypted payloads requiring decryption processing. When the system receives a communication between services, the second inspection layer component may examine the communication structure to determine whether the payload has been encrypted and requires decryption operations. The system may analyze various indicators within the communication to make this determination, including header flags, metadata markers, or payload characteristics that may signal the presence of encrypted content.

The system may detect the presence of encrypted communication payloads by examining specific flags within the communication headers or metadata sections. In particular, the second inspection layer component may search for predetermined flag identifiers that may indicate encryption status, such as header fields labeled with encryption indicators or boolean values that may specify whether the payload contains encrypted data. The system may parse communication headers to locate flags such as 'x-ccp-enc-payload' or similar markers that may be set to true when the communication payload has been encrypted by the originating service or inspection layer component.

The system may implement flag-based detection logic that may evaluate the encryption status indicators within each incoming communication. The second inspection layer component may examine the communication headers to identify boolean flags, enumerated values, or string indicators that may specify the encryption state of the payload. The system may recognize various flag formats, including HTTP headers, custom protocol fields, or embedded metadata tags that may contain encryption status information. The detection mechanism may support multiple flag naming conventions and value formats to accommodate different service communication protocols and standards.

Based on determining that the communication has the encrypted communication payload, the system may initiate interception procedures to process the encrypted content through the decryption subsystems. The second inspection layer component may redirect the communication from normal routing paths to specialized processing pipelines that may handle encrypted payload decryption. The system may implement communication filters that may intercept communications containing encrypted payloads while allowing unencrypted communications to pass through without additional processing overhead.

In some implementations, the system may operate as an intermediary layer between communicating services, where the first service and the second service may communicate directly with each other under normal circumstances. The inspection layer component may intercept each communication between the first service and the second service via a communication filter that may examine the encryption status of each message. The system may implement transparent interception mechanisms that may not require modifications to the communicating services, allowing existing service-to-service communication patterns to continue while adding encryption detection and processing capabilities.

The communication filter may function as a selective interceptor that may analyze incoming communications and determine appropriate processing paths based on encryption status. The system may implement policy-driven filtering logic that may route encrypted communications through decryption processing while bypassing unencrypted communications to maintain performance characteristics. The filter may examine communication metadata, payload characteristics, or header information to make routing decisions without requiring deep packet inspection or payload analysis.

Based on determining that the communication does not have the encrypted communication payload, the system may refrain from intercepting the communication and allow normal service-to-service communication flow. The second inspection layer component may implement bypass mechanisms that may route unencrypted communications directly to their intended destinations without subjecting them to decryption processing overhead. The system may maintain performance optimization by avoiding unnecessary processing of communications that do not require encryption or decryption operations.

The system may implement selective processing policies that may determine which communications require interception based on encryption status, service relationships, or security policies. The second inspection layer component may evaluate multiple criteria when determining whether to intercept communications, including the presence of encryption flags, service identity verification, or policy-based rules that may specify encryption requirements for specific service pairs or data types. The system may support configurable interception policies that may allow administrators to define which communications require encryption processing based on organizational security requirements.

The system may maintain audit trails and logging capabilities that may track interception decisions and processing outcomes for encrypted and unencrypted communications. The second inspection layer component may record metadata about each communication, including encryption status detection results, interception decisions, and processing paths taken for each message. The system may generate reports and metrics that may provide visibility into communication patterns, encryption usage, and system performance characteristics across different service interactions.

The system may utilize specialized data structures for managing cryptographic materials and communication metadata across distributed service environments. These data structures may provide organized storage and efficient retrieval mechanisms for the various parameters and identifiers used during secure communication processing. The data structures may enable the system to maintain relationships between services, track communication sessions, and store cryptographic parameters in formats that may facilitate rapid lookup operations and correlation activities across multiple system components.

Referring to FIG. 8, the system may implement a pair-wise key data structure 800 for storing cryptographic keys associated with specific service pairings. The pair-wise key data structure 800 may organize information in a tabular format that may enable efficient storage and retrieval of cryptographic materials based on service relationships. A pair identifier 802 may serve as a unique reference for each service pairing within the system, providing a distinct identifier that may be used for indexing and lookup operations. The pair identifier 802 may contain alphanumeric values such as "P101", "P102", or "P103" that may distinguish different service pairings from one another. A first service identifier 804 may specify the identity of one service in the pairing, containing values that may indicate both the environment and service designation. A second service identifier 806 may identify the corresponding service in the pairing, with values that may specify the partner service for cryptographic operations. A secret key 808 may contain the actual cryptographic material used for encryption and decryption operations between the paired services, storing values that may represent the shared cryptographic secrets.

Pair-wise key data structure 800 may enable the system to maintain separate cryptographic materials for each unique service pairing, ensuring that communications between different service combinations use distinct encryption parameters. First key storage subsystem 728 and second key storage subsystem 748 may utilize pair-wise key data structure 800 to cache frequently accessed cryptographic materials locally within their respective environments. The system may implement caching of shared secrets at the service level to avoid repeated calls to authorization servers for performance optimization, storing secret key 808 values in local memory structures that may reduce latency during encryption and decryption operations. Pair identifier 802 may serve as a lookup key that may enable rapid retrieval of the appropriate secret key 808 when processing communications between specific service pairs.

With continued reference to FIG. 8, pair-wise key data structure 800 may support scalable key management across large numbers of service pairings by providing a structured approach to organizing cryptographic relationships. The system may populate first service identifier 804 and second service identifier 806 with hierarchical naming conventions that may indicate environment boundaries, service categories, or organizational structures within the distributed system. Secret key 808 may contain cryptographic material generated through elliptic curve operations or other key derivation processes that may ensure appropriate security properties for the intended encryption algorithms. Pair-wise key data structure 800 may be replicated across multiple system components to provide redundancy and availability for cryptographic operations, with synchronization mechanisms ensuring consistency of secret key 808 values across different storage locations.

Referring to FIG. 9, the system may implement an initial decryption vector data structure 900 for managing the unique parameters used in individual communication sessions. The initial decryption vector data structure 900 may store information that may enable the system to generate appropriate decryption keys for each incoming encrypted communication. A communication identifier field 902 may contain unique identifiers such as "C101", "C102", or "C103" that may distinguish individual communications from one another within the system. A communication payload field 904 may store payload data that may represent the encrypted content transmitted between services. An initial decryption vector field 906 may contain vector values that may provide the cryptographic parameters for generating unique decryption keys. Data field 908 may store additional information that may contain supplementary metadata or cryptographic parameters associated with each communication.

Initial decryption vector data structure 900 may enable the system to maintain the cryptographic parameters for each communication session, ensuring that the appropriate decryption operations may be performed when processing encrypted payloads. Initial decryption vector field 906 may store 96-bit random strings generated for each transaction to ensure uniqueness across different communications between services. Second decryption subsystem 746 may utilize initial decryption vector data structure 900 to retrieve the appropriate vector values when processing incoming encrypted communications from first service 750. Communication identifier field 902 may serve as a correlation mechanism that may link the encrypted payload stored in communication payload field 904 with the corresponding decryption parameters stored in initial decryption vector field 906. Data field 908 may contain additional cryptographic materials or metadata that may be utilized during the decryption process, such as authentication tags or supplementary key derivation parameters.

As further shown in FIG. 9, initial decryption vector data structure 900 may support the generation of unique decryption keys by providing the vector parameters that may be combined with pair-wise secret keys during cryptographic operations. The system may populate the initial decryption vector field 906 with randomly generated values that may ensure each communication session uses distinct cryptographic parameters, preventing replay attacks and maintaining security isolation between different communication sessions. Communication payload field 904 may store the encrypted data in various formats, including binary representations or encoded strings that may be compatible with different encryption algorithms and data transmission protocols. Initial decryption vector data structure 900 may be maintained in memory structures that may enable rapid access during high-volume communication processing, with indexing mechanisms based on the communication identifier field 902 facilitating efficient lookup operations.

Referring to FIG. 10, the system may implement the tracking data structure 1000 for storing comprehensive tracking information that may enable monitoring and correlation of communications across distributed service environments. The tracking data structure 1000 may provide mechanisms for associating individual communications with broader transaction contexts and maintaining audit trails for security and compliance purposes. Communication identifier field 1002 may contain communication identifiers such as "C101", "C102", or "C103" that may link tracking information to specific communication sessions. A tracking identifier field 1004 may store tracking identifiers that may provide broader correlation mechanisms for related communications or transaction flows. A span identifier field 1006 may contain span identifiers that may enable hierarchical tracking of nested operations within complex transaction processing. Data field 1008 may store additional data values that may contain supplementary tracking metadata or correlation parameters.

Tracking data structure 1000 may enable tracing database 780 to maintain comprehensive records of communication flows and processing events across the distributed system architecture. Tracking identifier field 1004 may store identifiers that may be generated for tracking progress of communications through various system components, enabling end-to-end visibility of transaction processing across multiple service interactions. Span identifier field 1006 may provide hierarchical correlation capabilities that may enable tracking of complex business transactions involving multiple service-to-service communications, with parent-child relationships between different span identifiers enabling nested transaction monitoring. Communication identifier field 1002 may serve as a primary key that may link tracking records to specific communication sessions, enabling correlation between tracking information and the actual encrypted payloads processed by the system.

With continued reference to FIG. 10, tracking data structure 1000 may support distributed tracing capabilities that may enable monitoring of communications as the communications traverse multiple environments and inspection layer components. The system may utilize the tracking identifier field 1004 values as input parameters for predetermined vector generation routines that may produce initial decryption vectors for cryptographic operations. Span identifier field 1006 may enable the system to maintain hierarchical relationships between related communications, supporting complex transaction flows that may involve multiple service interactions across different environments. Data field 1008 may contain timestamps, processing status information, or additional metadata that may facilitate debugging, performance analysis, and security monitoring activities across the distributed service architecture. In some implementations a mix of a tracking identifier and span identifier may be used to generate the initial decryption and/or encryption key.

Referring to FIG. 11, the system may implement a communication data structure 1100 for storing communication information that may facilitate the processing and management of encrypted payloads during service-to-service interactions. Communication data structure 1100 may provide organized storage for the various parameters and data elements associated with individual communication sessions. A communication identifier field 1102 may contain communication identifiers such as "C101", "C102", or "C103" that may uniquely identify individual communications within the system processing pipeline. An encrypted payload field 1104 may store encrypted payload data that may represent the actual encrypted content transmitted between services. A first parameter field 1106 may contain parameter values that may store cryptographic parameters or metadata associated with the encryption operations. A second parameter field 1108 may store additional parameter values that may contain supplementary cryptographic materials or processing parameters.

Communication data structure 1100 may enable first inspection layer component 720 and second inspection layer component 740 to manage the various data elements associated with encrypted communications during processing operations. Encrypted payload field 1104 may store the actual encrypted content that may be transmitted between first service 750 and second service 760, maintaining the encrypted data in formats that may be compatible with the decryption algorithms employed by the system. First parameter field 1106 may contain initial decryption vectors or other cryptographic parameters that may be utilized during the decryption process, providing the system with the information needed to generate appropriate decryption keys. Second parameter field 1108 may store additional cryptographic materials such as authentication tags, key identifiers, or supplementary parameters that may be utilized during encryption and decryption operations.

As further shown in FIG. 11, communication data structure 1100 may support the processing of communications that may contain encrypted payloads requiring specialized handling by the inspection layer components. Communication identifier field 1102 may serve as a correlation key that may enable the system to associate encrypted payloads with their corresponding decryption parameters and tracking information stored in other data structures. The system may utilize first parameter field 1106 and second parameter field 1108 to store the various cryptographic parameters that may be transmitted alongside encrypted payloads, ensuring that receiving components have access to the information needed for successful decryption operations. Communication data structure 1100 may be maintained in memory structures that may enable efficient processing of high-volume communication flows, with indexing and caching mechanisms facilitating rapid access to encrypted payload field 1104 and associated parameter fields during decryption operations.

The system may implement a comprehensive process flow for securing communications between services that may coordinate multiple operations across distributed environments to ensure end-to-end encryption capabilities. Referring to FIG. 12, process 1200 may illustrate the systematic approach for establishing secure communication channels between services operating in different environments. Process 1200 may begin with cryptographic key establishment and may progress through communication interception, encryption parameter generation, decryption operations, and final payload delivery to target services. Process 1200 may integrate with the first inspection layer component 720 and the second inspection layer component 740 to provide transparent encryption and decryption services that may operate independently of the microservice business logic using an injector pattern.

The system may establish cryptographic foundations for secure service communications through pair-wise secret key generation mechanisms. At 1202, the system generates a pair-wise secret key for a pair of services including first service 750 and second service 760. The pair-wise secret key generation may utilize elliptic curve cryptography algorithms that may create unique cryptographic materials for each specific service pairing within the distributed architecture. The system may use processor(s) 510*a*, 510*b*, and/or 510*n* to perform this operation.

The system may distribute cryptographic materials to inspection layer components to enable encryption and decryption operations across distributed environments. At 1204, the system provides the pair-wise secret key to first inspection layer component 720 and to second inspection layer component 740. Communication subsystem 162 may coordinate the secure transmission of cryptographic materials between different system components while maintaining the integrity and confidentiality of the secret key values. First key storage subsystem 728 may cache the pair-wise secret key locally within first environment 700 to enable rapid access during encryption operations. Second key storage subsystem 748 may similarly store the pair-wise secret key within the second environment 710 to facilitate decryption processing without requiring repeated key retrieval operations from external key management systems. The system may use processor(s) 510*a*, 510*b*, and/or 510*n* to perform this operation.

The system may intercept communications containing encrypted payloads that may require specialized processing through the inspection layer components. At 1206, the system receives a communication including an encrypted communication payload from first service 750 at second inspection layer component 740. Second communication subsystem 742 may detect incoming communications and may route encrypted payloads through appropriate processing pipelines based on encryption status indicators within the communication headers. The inspection layer components may implement filters or interceptors that may operate independently of the microservice business logic using an injector pattern, allowing the security framework to process communications without requiring modifications to existing service code. Operation 1206 may support selective processing policies where the system may examine egress policies that may determine which APIs require encryption based on declarative configuration, allowing selective encryption at the API level. The system may use Network interface 540 to perform this operation.

The system may derive unique cryptographic parameters for each communication session to ensure security isolation between different message exchanges. At 1208, the system determines an initial decryption vector for generating a unique decryption key using the communication content or associated metadata. The initial decryption vector may be specifically a 96-bit random string generated for each transaction to ensure uniqueness across different communications between services. Second inspection layer component 740 may extract the initial decryption vector from data fields within the communication structure or may generate the vector using predetermined algorithms that may process tracking identifiers or communication content. The system may use processor(s) 510*a*, 510*b*, and/or 510*n* to perform this operation.

The system may combine cryptographic materials to produce session-specific encryption keys that may enable secure payload processing. At 1210, the system may generate the unique decryption key using a combination of the initial decryption vector and the pair-wise secret key. The key generation process may concatenate the initial decryption vector with the pair-wise secret key to create composite input material for key derivation functions. Second decryption subsystem 746 may process the combined cryptographic parameters through algorithms that may produce decryption keys with appropriate security properties for the intended encryption operations. The system may use processor(s) 510*a*, 510*b*, and/or 510*n* to perform this operation.

The system may convert encrypted payloads back to plaintext format to enable processing by target services within the distributed architecture. At 1212 the system decrypts the encrypted communication payload using the unique decryption key to generate a decrypted communication. Second decryption subsystem 746 may utilize AES encryption algorithm with GCM mode and NoPadding for encrypting payloads, providing authenticated encryption with associated data capabilities during the decryption process. The decryption operations may reverse the encryption transformations applied by first encryption subsystem 724, converting the encrypted payload back to the original plaintext format. The system may use processor(s) 510*a*, 510*b*, and/or 510*n* to perform this operation.

The system may deliver decrypted communications to target services while maintaining transparency of the encryption and decryption operations. At 1214, the system transmits the decrypted communication from the inspection layer to second service 760 for processing. Second communication subsystem 742 may route the decrypted payload to the second service 760 through normal service communication channels, allowing the target service to process the content as if the communication had been received in plaintext form. The system may use network interface 540 to perform this operation.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method comprising: receiving, at a server, an authorization request to generate an authorization token for a service, wherein the authorization request comprises i) an indication of a service public key associated with the service and ii) an encrypted service account token associated with the service, wherein the encrypted service account token is generated by encrypting a service account token using a first service key generated based on a client private key and a server public key, and wherein the client private key is associated with a requesting device hosting the service; decrypting, using a second service key, the encrypted service account token, wherein the second service key is generated based on a client public key associated with the requesting device hosting the service and a server private key associated with the server; generating, based on the service account token, a service identity for the service, wherein the service identity comprises a cluster identifier, a name space, and a deployment name, wherein the cluster identifier, the name space, and the deployment name are retrieved from the service account token; generating, for the service identity, a key identifier and an access key pair comprising a private access key and a public access key; generating a service identity token comprising the service identity, the private access key, and the key identifier; generating a server token comprising access permissions for the service; encrypting the server token and the service identity token using the second service key into an encrypted usage token; and transmitting the encrypted usage token to the requesting device, the requesting device being configured for decrypting the encrypted usage token using the first service key.

A2. A method comprising: receiving, at a server, an authorization request to generate an authorization token for a service, wherein the authorization request comprises i) an indication of a service public key associated with the service and ii) an encrypted service account token associated with the service; decrypting, using a second service key, the encrypted service account token into a service account token, wherein the second service key is generated based on a client public key associated with a requesting device hosting the service and a server private key associated with the server; generating, based on the service account token, a service identity for the service; generating, for the service identity, a key identifier and an access key pair comprising a private access key and a public access key; generating a service identity token comprising the service identity, the private access key, and the key identifier; generating a server token comprising access permissions for the service; encrypting the server token and the service identity token using the second service key into an encrypted usage token; and transmitting the encrypted usage token to the requesting device, the requesting device being configured for decrypting the encrypted usage token using a first service key.

A3. The method of any of the preceding embodiments, wherein the encrypted service account token is encrypted using the first service key generated based on a client private key and a server public key, and wherein the client private key is associated with the requesting device hosting the service.

A4. The method of any of the preceding embodiments, wherein the service identity comprises a cluster identifier, a name space, and a deployment name, wherein the cluster identifier, the name space, and the deployment name are retrieved from the service account token.

A5. The method of any of the preceding embodiments, further comprising: inserting the private access key into a key vault associated with the service identity; and caching the key identifier and the public access key.

A6. The method of any of the preceding embodiments, further comprising determining that the key identifier is not found in cache memory; generating a vault request for the public access key, wherein the vault request comprises the key identifier; receiving the public access key from the key vault; and caching the public access key and the key identifier in the cache memory.

A7. The method of any of the preceding embodiments, further comprising: receiving from a remote device a validation request for the service, wherein the validation request comprises the key identifier and the service identity token; determining, based on the key identifier, the public access key associated with the service; and transmitting the public access key associated with the service to the remote device, wherein the remote device uses the public access key to validate the service identity token.

A8. The method of any of the preceding embodiments, wherein generating the server token comprising the access permissions for the service further comprises: receiving a token refresh request comprising the encrypted service account token and the client public key; decrypting the encrypted service account token to retrieve the service identity; generating a new key identifier and a new service identity token using the client public key; and transmitting the new service identity token and the new key identifier to the requesting device.

A9. The method of any of the preceding embodiments, wherein generating the server token comprising the access permissions for the service further comprises: retrieving the access permissions for the service; transforming the access permissions into token format; and adding the access permissions to the server token.

A10. One or more tangible, non-transitory, computer-readable media storing instructions that, when executed by a data processing apparatus, cause the data processing apparatus to perform operations comprising those of any of embodiments A1-9.

A11. A system comprising: one or more processors; and memory storing instructions that, when executed by the one or more processors, cause the processors to effectuate operations comprising those of any of embodiments A1-9.

A12. A system comprising means for performing any of embodiments A1-9.

A13. A system comprising cloud-based circuitry for performing any of embodiments A1-9.

The following examples pertain to further embodiments.

B1. A method comprising: generating, at an inspection layer, a pair-wise secret key for a pair of services comprising a first service and a second service, wherein the first service is located within a cloud environment and the second service is located within an on-premises environment and wherein the first service is associated with a first inspection layer component and the second service is associated with a second inspection layer component; providing the pair-wise secret key to the first inspection layer component and to the second inspection layer component; receiving, from the first service at the second inspection layer component associated with the second service, a communication comprising an encrypted communication payload; determining, using the communication, an initial decryption vector for generating a unique decryption key, wherein the unique decryption key is used to decrypt the encrypted communication payload, wherein the initial decryption vector is different for each communication between the first service and the second service; generating the unique decryption key using a combination of the initial decryption vector and the pair-wise secret key, wherein the unique decryption key is different for each communication between the first service and the second service; decrypting the encrypted communication payload using the unique decryption key to generate a decrypted communication; and transmitting the decrypted communication from the inspection layer to the second service, wherein the second service processes the decrypted communication.

B2. The method of embodiment B1, further comprising: receiving, from the second service at the second inspection layer component associated with the second service, a response communication comprising an unencrypted response payload; generating a new initial encryption vector, wherein the new initial encryption vector corresponds to a new initial decryption vector, and wherein the new initial decryption vector is used with the pair-wise secret key to generate a new decryption key, wherein the new initial decryption vector is different from the initial decryption vector; generating a new encryption key using the new initial encryption vector and the pair-wise secret key; encrypting the unencrypted response payload using the new encryption key to generate a new encrypted payload; and transmitting the new encrypted payload from the second inspection layer component to the first inspection layer component, wherein the first inspection layer component decrypts the new encrypted payload using a new initial decryption vector corresponding to the new initial encryption vector and the pair-wise secret key.

B3. The method of any preceding embodiments, wherein the new initial encryption vector is transmitted together with the new encrypted payload.

4. The method of any preceding embodiments, further comprising: generating a new tracking identifier associated with the communication, wherein the new tracking identifier is generated for tracking progress of the communication; and transmitting the new tracking identifier to a tracking database.

5. The method of any preceding embodiments, wherein determining the initial decryption vector further comprises: extracting, from the communication, a data field storing the initial decryption vector, wherein the initial decryption vector within the communication is different than other initial decryption vectors within other communications between the first service and the second service; and storing the initial decryption vector.

6. The method of any preceding embodiments, wherein determining the initial decryption vector further comprises: retrieving, from a tracking database, a tracking identifier associated with the communication, wherein the tracking identifier is generated for tracking progress of the communication; and inputting the tracking identifier associated with the communication into a predetermined vector generation routine to generate the initial decryption vector.

7. The method of any preceding embodiments, wherein determining the initial decryption vector further comprises: generating a key value from the communication or from one or more predetermined portions of the communication; and inputting the key value into a predetermined vector generation routine to generate the initial decryption vector.

8. The method of any preceding embodiments, wherein generating the unique decryption key using the combination of the initial decryption vector and the pair-wise secret key comprises concatenating the initial decryption vector and the pair-wise secret key.

9. The method of any preceding embodiments, further comprising: detecting, using the second inspection layer component based on a flag within the communication, whether the communication has the encrypted communication payload; based on determining that the communication has the encrypted communication payload, intercepting the communication, wherein the first service and the second service communicate directly with each other, and the inspection layer intercepts each communication between the first service and the second service via a communication filter; and based on determining that the communication does not have the encrypted communication payload, refraining from intercepting the communication.

B10. One or more tangible, non-transitory, computer-readable media storing instructions that, when executed by a data processing apparatus, cause the data processing apparatus to perform operations comprising those of any of embodiments A1-9.

B11. A system comprising: one or more processors; and memory storing instructions that, when executed by the one or more processors, cause the processors to effectuate operations comprising those of any of embodiments A1-9.

B12. A system comprising means for performing any of embodiments A1-9.

B13. A system comprising cloud-based circuitry for performing any of embodiments A1-9.

The invention claimed is:

1. A system for securing communications, the system comprising:

one or more processors; and one or more non-transitory, computer-readable storage media storing instructions, which when executed by the one or more processors cause the one or more processors to perform operations comprising:

generating, at an inspection layer, a pair-wise secret key for a pair of services comprising a first service and a second service, wherein the first service is located within a cloud environment and the second service is located within an on-premises environment, and wherein the first service is associated with a first inspection layer component and the second service is associated with a second inspection layer component;

providing the pair-wise secret key to the first inspection layer component and to the second inspection layer component;

receiving, from the first service at the second inspection layer component associated with the second service, a communication comprising an encrypted communication payload;

generating, by transforming a plurality of data fields within the communication into an initial decryption vector, the initial decryption vector for generating a unique decryption key, wherein the unique decryption key is used to decrypt the encrypted communication payload, and wherein the initial decryption vector is different for each communication between the first service and the second service;

generating the unique decryption key using a combination of the initial decryption vector and the pair-wise secret key, wherein the unique decryption key is different for each communication between the first service and the second service;

decrypting the encrypted communication payload using the unique decryption key to generate a decrypted communication; and transmitting the decrypted communication from the inspection layer to the second service, wherein the second service processes the decrypted communication.

2. The system of claim 1, wherein the instructions further cause the one or more processors to perform operations comprising:

receiving, from the second service at the second inspection layer component associated with the second service, a response communication comprising an unencrypted response payload;

generating a new initial encryption vector, wherein the new initial encryption vector corresponds to a new initial decryption vector, and wherein the new initial decryption vector is used with the pair-wise secret key to generate a new decryption key, wherein the new initial decryption vector is different from the initial decryption vector;

generating a new encryption key using the new initial encryption vector and the pair-wise secret key;

encrypting the unencrypted response payload using the new encryption key to generate a new encrypted payload; and transmitting the new encrypted payload from the second inspection layer component to the first inspection layer component, wherein the first inspection layer component decrypts the new encrypted payload using the new initial decryption vector identical to the new initial encryption vector and the pair-wise secret key.

3. The system of claim 2, wherein the new initial encryption vector is transmitted together with the new encrypted payload.

4. The system of claim 2, wherein the instructions further cause the one or more processors to perform operations comprising:

generating a new tracking identifier associated with the communication, wherein the new tracking identifier is generated for tracking progress of the communication; and transmitting the new tracking identifier to a tracking database.

5. The system of claim 1, wherein the instructions for determining the initial decryption vector further cause the one or more processors to perform operations comprising:

extracting, from the communication, a data field storing the initial decryption vector, wherein the initial decryption vector within the communication is different than other initial decryption vectors within other communications between the first service and the second service; and storing the initial decryption vector in memory.

6. The system of claim 1, wherein the instructions for determining the initial decryption vector further cause the one or more processors to perform operations comprising:

generating a key value from the communication or from one or more predetermined portions of the communication; and inputting the key value into a predetermined vector generation routine to generate the initial decryption vector.

7. The system of claim 1, wherein the instructions for generating the unique decryption key using the combination of the initial decryption vector and the pair-wise secret key comprises concatenating the initial decryption vector and the pair-wise secret key.

8. The system of claim 1, wherein the instructions further cause the one or more processors to perform operations comprising:

detecting, using the second inspection layer component and based on a flag within the communication, whether the communication has the encrypted communication payload;

based on determining that the communication has the encrypted communication payload, intercepting the communication, wherein the first service and the second service communicate directly with each other, and wherein the inspection layer intercepts each communication between the first service and the second service via a communication filter; and based on determining that the communication does not have the encrypted communication payload, refraining from intercepting the communication.

9. A method for securing communications, the method comprising:

generating, at an inspection layer, a pair-wise secret key for a pair of services comprising a first service and a second service, wherein the first service is located within a cloud environment and the second service is located within an on-premises environment, and wherein the first service is associated with a first inspection layer component and the second service is associated with a second inspection layer component;

providing the pair-wise secret key to the first inspection layer component and to the second inspection layer component;

receiving, from the first service at the second inspection layer component associated with the second service, a communication comprising an encrypted communication payload;

retrieving, from a tracking database, a tracking identifier associated with the communication, wherein the tracking identifier is generated for tracking progress of the communication;

generating, by transforming the tracking identifier retrieved from the tracking database into an initial decryption vector, the initial decryption vector for generating a unique decryption key, wherein the unique decryption key is used to decrypt the encrypted communication payload, wherein the initial decryption vector is different for each communication between the first service and the second service;

generating the unique decryption key using a combination of the initial decryption vector and the pair-wise secret key, wherein the unique decryption key is different for each communication between the first service and the second service;

decrypting the encrypted communication payload using the unique decryption key to generate a decrypted communication; and transmitting the decrypted communication from the inspection layer to the second service, wherein the second service processes the decrypted communication.

10. The method of claim 9, further comprising:

receiving, from the second service at the second inspection layer component associated with the second service, a response communication comprising an unencrypted response payload;

generating a new initial encryption vector, wherein the new initial encryption vector corresponds to a new initial decryption vector, and wherein the new initial decryption vector is used with the pair-wise secret key to generate a new decryption key, wherein the new initial decryption vector is different from the initial decryption vector;

generating a new encryption key using the new initial encryption vector and the pair-wise secret key;

encrypting the unencrypted response payload using the new encryption key to generate a new encrypted payload; and transmitting the new encrypted payload from the second inspection layer component to the first inspection layer component, wherein the first inspection layer component decrypts the new encrypted payload using the new initial decryption vector identical to the new initial encryption vector and the pair-wise secret key.

11. The method of claim 10, wherein the new initial encryption vector is transmitted together with the new encrypted payload.

12. The method of claim 10, further comprising:

generating a new tracking identifier associated with the communication, wherein the new tracking identifier is generated for tracking progress of the communication; and transmitting the new tracking identifier to the tracking database.

13. The method of claim 9, wherein determining the initial decryption vector further comprises:

extracting, from the communication, a data field storing the initial decryption vector, wherein the initial decryption vector within the communication is different than other initial decryption vectors within other communications between the first service and the second service; and storing the initial decryption vector.

14. The method of claim 9, wherein determining the initial decryption vector further comprises:

generating a key value from the communication or from one or more predetermined portions of the communication; and inputting the key value into a predetermined vector generation routine to generate the initial decryption vector.

15. The method of claim 9, wherein generating the unique decryption key using the combination of the initial decryption vector and the pair-wise secret key comprises concatenating the initial decryption vector and the pair-wise secret key.

16. The method of claim 9, further comprising:

detecting, using the second inspection layer component and based on a flag within the communication, whether the communication has the encrypted communication payload;

based on determining that the communication has the encrypted communication payload, intercepting the communication, wherein the first service and the second service communicate directly with each other, and wherein the inspection layer intercepts each communication between the first service and the second service via a communication filter; and based on determining that the communication does not have the encrypted communication payload, refraining from intercepting the communication.

17. One or more non-transitory, computer-readable media storing instructions thereon that when executed by one or more processors cause the one or more processors to perform operations comprising:

generating, at an inspection layer, a pair-wise secret key for a pair of services comprising a first service and a second service, wherein the first service is located within a cloud environment and the second service is located within an on-premises environment and wherein the first service is associated with a first inspection layer component and the second service is associated with a second inspection layer component;

providing the pair-wise secret key to the first inspection layer component and to the second inspection layer component;

receiving, from the first service at the second inspection layer component associated with the second service, a communication comprising an encrypted communication payload;

generating, by transforming a plurality of data fields within the communication into an initial decryption vector, the initial decryption vector for generating a unique decryption key, wherein the unique decryption key is used to decrypt the encrypted communication payload, and wherein the initial decryption vector is different for each communication between the first service and the second service;

generating the unique decryption key using a combination of the initial decryption vector and the pair-wise secret key, wherein the unique decryption key is different for each communication between the first service and the second service;

decrypting the encrypted communication payload using the unique decryption key to generate a decrypted communication; and transmitting the decrypted communication from the inspection layer to the second service, wherein the second service processes the decrypted communication.

18. The one or more non-transitory, computer-readable media of claim 17, wherein the instructions further cause the one or more processors to perform operations comprising:

receiving, from the second service at the second inspection layer component associated with the second service, a response communication comprising an unencrypted response payload;

generating a new initial encryption vector, wherein the new initial encryption vector corresponds to a new initial decryption vector, and wherein the new initial decryption vector is used with the pair-wise secret key to generate a new decryption key, wherein the new initial decryption vector is different from the initial decryption vector;

generating a new encryption key using the new initial encryption vector and the pair-wise secret key;

encrypting the unencrypted response payload using the new encryption key to generate a new encrypted payload; and transmitting the new encrypted payload from the second inspection layer component to the first inspection layer component, wherein the first inspection layer component decrypts the new encrypted payload using the new initial decryption vector identical to the new initial encryption vector and the pair-wise secret key.

* * * * *